(12) United States Patent
Morandin

(10) Patent No.: US 9,860,185 B2
(45) Date of Patent: Jan. 2, 2018

(54) INTRA SWITCH TRANSPORT PROTOCOL

(71) Applicant: Cisco Technology, Inc., San Jose, CA (US)

(72) Inventor: Guglielmo Morandin, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 266 days.

(21) Appl. No.: 13/826,824

(22) Filed: Mar. 14, 2013

(65) Prior Publication Data

US 2014/0269302 A1 Sep. 18, 2014

(51) Int. Cl.
*H04L 12/807* (2013.01)
*H04L 12/801* (2013.01)

(52) U.S. Cl.
CPC .............. *H04L 47/27* (2013.01); *H04L 47/11* (2013.01); *H04L 47/193* (2013.01)

(58) Field of Classification Search
CPC ....... H04L 47/10; H04L 47/193; H04L 47/20; H04L 47/215; H04L 47/22; H04L 47/27; H04L 47/11
USPC ................................ 370/230, 235, 236, 252
See application file for complete search history.

(56) References Cited

U.S. PATENT DOCUMENTS

| | | | |
|---|---|---|---|
| 5,042,029 A * | 8/1991 | Hayakawa | ..................... 370/231 |
| 5,163,046 A | 11/1992 | Hahne et al. | |
| 5,592,627 A | 1/1997 | Burt et al. | |
| 6,105,064 A | 8/2000 | Davis et al. | |
| 6,151,300 A * | 11/2000 | Hunt et al. | ..................... 370/231 |
| 6,249,530 B1 | 6/2001 | Blanco et al. | |
| 6,256,675 B1 | 7/2001 | Rabinovich | |
| 6,415,410 B1 | 7/2002 | Kanerva et al. | |
| 6,430,153 B1 | 8/2002 | Hughes et al. | |
| 6,493,316 B1 | 12/2002 | Chapman et al. | |
| 6,603,772 B1 | 8/2003 | Moussavi et al. | |
| 6,654,363 B1 | 11/2003 | Li et al. | |

(Continued)

FOREIGN PATENT DOCUMENTS

| | | |
|---|---|---|
| CN | 101001210 A | 7/2007 |
| CN | 102739516 A | 10/2012 |

(Continued)

OTHER PUBLICATIONS

Deng Pan et al, FIFO-Based Multicast Scheduling Algorithm for Virtual Output Queued Packet Switches, Oct. 2005, vol. 54, IEEE Transactions on Computers.

(Continued)

*Primary Examiner* — Benjamin H Elliott, IV
*Assistant Examiner* — Prince A Mensah

(57) ABSTRACT

In one implementation, a network device is configured to implement an intra switch transport protocol. The intra switch transport protocol is configured to determine a maximum window size according to a predetermined bandwidth and a round trip time between a plurality of ingress ports and an egress port. The network device is configured to calculate an assigned window value for the one of the plurality of ingress ports based on the maximum window size and generate an acknowledgment message including the assigned window value for the one of the plurality of ingress ports, and to delay successive acknowledgement messages according to fabric congestion and egress port occupancy.

20 Claims, 11 Drawing Sheets

(56) References Cited

U.S. PATENT DOCUMENTS

| | | | |
|---|---|---|---|
| 6,717,945 B1 | 4/2004 | Jue et al. | |
| 6,721,273 B1* | 4/2004 | Lyon | H04L 49/255 |
| | | | 370/235 |
| 6,728,210 B1 | 4/2004 | El-Khoury et al. | |
| 6,751,219 B1 | 6/2004 | Lipp et al. | |
| 6,757,255 B1* | 6/2004 | Aoki | H04L 1/187 |
| | | | 370/229 |
| 6,775,280 B1 | 8/2004 | Ma et al. | |
| 6,999,453 B1 | 2/2006 | Chemla et al. | |
| 7,010,611 B1 | 3/2006 | Wiryaman et al. | |
| 7,085,846 B2 | 8/2006 | Jenne et al. | |
| 7,245,626 B1* | 7/2007 | Sindhu | H04L 12/5693 |
| | | | 370/412 |
| 7,519,054 B2 | 4/2009 | Varma | |
| 7,583,594 B2 | 9/2009 | Zakrzewski | |
| 7,616,571 B1 | 11/2009 | Srinivasan et al. | |
| 7,643,418 B1 | 1/2010 | Varier et al. | |
| 7,656,800 B2 | 2/2010 | Morandin | |
| 7,675,857 B1 | 3/2010 | Chesson | |
| 7,760,633 B2 | 7/2010 | Morandin | |
| 7,778,164 B2 | 8/2010 | Shimonishi | |
| 7,787,379 B2 | 8/2010 | Mekkattuparamban et al. | |
| 7,859,999 B1 | 12/2010 | Basu et al. | |
| 7,869,395 B2 | 1/2011 | Wise et al. | |
| 8,150,995 B2 | 4/2012 | Weston et al. | |
| 8,189,476 B1 | 5/2012 | Rothstein et al. | |
| 8,233,438 B2 | 7/2012 | Wise et al. | |
| 8,340,099 B2 | 12/2012 | Black et al. | |
| 8,457,053 B2 | 6/2013 | Wise et al. | |
| 8,719,398 B2 | 5/2014 | Qian et al. | |
| 8,767,752 B1* | 7/2014 | Tripathi et al. | 370/401 |
| 8,787,378 B2 | 7/2014 | Lee et al. | |
| 8,797,871 B2 | 8/2014 | Morandin | |
| 8,797,877 B1* | 8/2014 | Perla | H04L 49/00 |
| | | | 370/230 |
| 8,873,385 B2 | 10/2014 | Wu et al. | |
| 9,344,533 B2 | 5/2016 | Weston et al. | |
| 2001/0015956 A1* | 8/2001 | Ono | H04L 1/0007 |
| | | | 370/229 |
| 2001/0050916 A1 | 12/2001 | Krishna et al. | |
| 2002/0085578 A1 | 7/2002 | Dell et al. | |
| 2002/0118689 A1 | 8/2002 | Luijten et al. | |
| 2002/0122421 A1 | 9/2002 | Ambiehl et al. | |
| 2003/0021282 A1 | 1/2003 | Hospodor | |
| 2003/0031193 A1* | 2/2003 | Andrews | H04L 12/5693 |
| | | | 370/412 |
| 2003/0058802 A1 | 3/2003 | Jones et al. | |
| 2003/0058880 A1 | 3/2003 | Sarkinen et al. | |
| 2003/0063609 A1* | 4/2003 | Bergenfeld | 370/390 |
| 2003/0179759 A1 | 9/2003 | Wang | |
| 2004/0022248 A1* | 2/2004 | Yuang et al. | 370/395.7 |
| 2004/0042397 A1 | 3/2004 | Chang et al. | |
| 2004/0109412 A1 | 6/2004 | Hansson et al. | |
| 2004/0109477 A1* | 6/2004 | Lee | H04L 47/12 |
| | | | 370/535 |
| 2005/0063301 A1* | 3/2005 | Glaise | H04L 47/125 |
| | | | 370/229 |
| 2005/0063303 A1* | 3/2005 | Samuels et al. | 370/229 |
| 2006/0045008 A1 | 3/2006 | Sun et al. | |
| 2006/0126509 A1 | 6/2006 | Abi-Nassif et al. | |
| 2007/0076621 A1* | 4/2007 | Malhotra et al. | 370/252 |
| 2007/0195761 A1* | 8/2007 | Tatar et al. | 370/389 |
| 2007/0237074 A1* | 10/2007 | Curry | H04L 47/10 |
| | | | 370/229 |
| 2007/0248009 A1* | 10/2007 | Petersen | 370/230 |
| 2008/0115128 A1 | 5/2008 | Achanta et al. | |
| 2010/0091782 A1* | 4/2010 | Hiscock | H04L 47/10 |
| | | | 370/412 |
| 2010/0220742 A1 | 9/2010 | Brewer et al. | |
| 2010/0246603 A1 | 9/2010 | Rabie et al. | |
| 2010/0316012 A1 | 12/2010 | Stanwood et al. | |
| 2011/0051604 A1 | 3/2011 | Nishimura | |
| 2012/0327779 A1* | 12/2012 | Gell et al. | 370/238 |
| 2013/0114408 A1 | 5/2013 | Sastry et al. | |
| 2013/0114593 A1 | 5/2013 | Jabr et al. | |
| 2014/0185612 A1* | 7/2014 | Ilyadis et al. | 370/359 |

FOREIGN PATENT DOCUMENTS

| | | |
|---|---|---|
| EP | 0661851 B1 | 7/1995 |
| EP | 1133110 A2 | 9/2001 |
| WO | WO2004023718 A2 | 3/2004 |
| WO | WO2012004689 A1 | 1/2012 |

OTHER PUBLICATIONS

Devavrat Shah et al., Optimal Scheduling Algorithms for Iput-Queued Switches, 2006, IEEE.

Nick Mckeown et al., the Tiny Tera: A Packet Switch Core, 1997, IEEE Micro.

Rajeev Sivaram et al., HIPIQS: A High-Performance Switch Architecture using Input Queuing, Apr. 1998, IEEE Transactions on Parallel and Distributed Systems.

A.S. Tanenbaum, et al., "Computer Networks", Dec. 31, 2011, pp. 246-264, Section 3.4 & 3.4.2, Boston, MA.

International Search Report and Written Opinion, from PCT/US2013/070235, dated May 23, 2014, WO.

International Search Report and Written Opinion, from PCT/US2013/072760, dated May 22, 2014, WO.

International Search Report and Written Opinion, from related PCT Application No. PCT/US2013/069562, dated Feb. 10, 2014, WO.

Partial International Search Report, from PCT/US2013/072760, dated Mar. 18, 2014, WO.

Partial Search Report cited in PCT/US2013/070235, dated Jan. 29, 2014.

International Search Report and Written Opinion, from PCT/US2014/016176, dated Sep. 15, 2014, WO.

Partial Search Report, from PCT/US2014/016176, dated Jun. 13, 2014, WO.

First Office Action in Chinese Application No. 201380063683.9, dated Feb. 15, 2017, 13 pages.

Communication from the European Patent Office in European Application No. 13 815 606.2, dated Apr. 5, 2017, 7 pages.

* cited by examiner

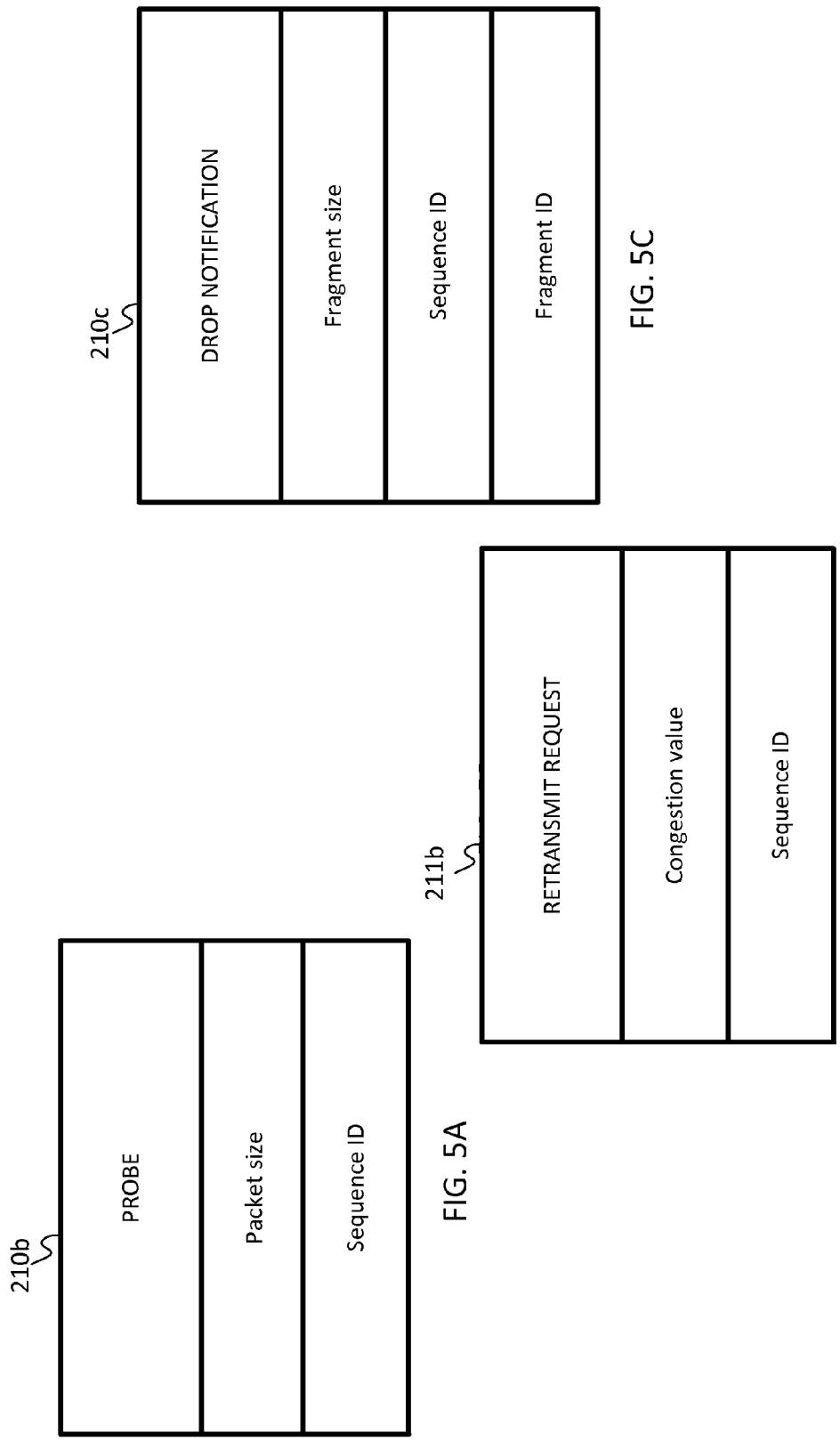

INTRA SWITCH TRANSPORT PROTOCOL

TECHNICAL FIELD

This disclosure relates in general to the field of internet protocol (IP) communication, more particularly, to a transport protocol for data transmission within a data switch.

BACKGROUND

IP communication involves the transmission of messages in the form of one or more data packets. The data packets include a source address and at least one destination address. A switch is a network device that directs traffic towards the destination address. Switches include multiple inputs and multiple outputs. A crossbar switch includes a selectable connection from each of the multiple inputs to each of the multiple outputs. A crossbar switch permits only one data packet to be transmitted to any one output at any particular time.

Arbitration schemes regulate data flows. In one example, the input must request to send data and receive a confirmation that data may be sent. These communications in the switch require time, which increases packet latency. In addition, congestion may occur at the inputs, at the outputs, or at the crossbar.

BRIEF DESCRIPTION OF THE DRAWINGS

Exemplary embodiments of the present embodiments are described herein with reference to the following drawings.

FIG. 5A illustrates an example probe message.

FIG. 5B illustrates an example retransmit request.

FIG. 5C illustrates an example drop notification.

DESCRIPTION OF EXAMPLE EMBODIMENTS

Overview

Figure 1:
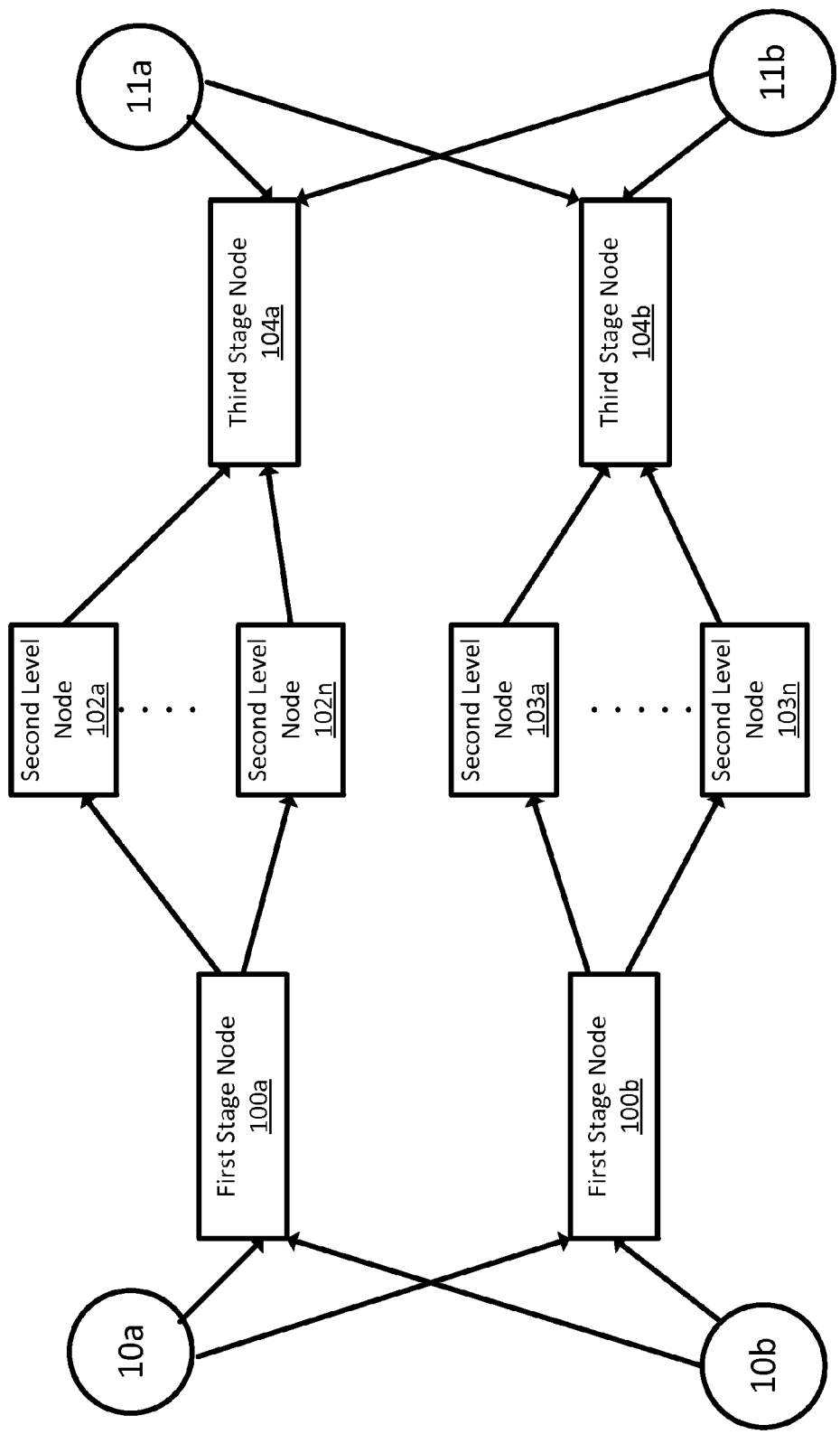
FIG. 1 illustrates an example network for internal communication in a switch.

In one example, a method includes identifying a maximum window size according to a predetermined bandwidth and a round trip time between a plurality of ingress ports and an egress port, calculating, by a controller, an assigned window value for the one of the plurality of ingress ports based on the maximum window size and an adjustment factor, and generating, by the controller, an acknowledgment message including the assigned window value for the one of the plurality of ingress ports. A ratio of the assigned window value to the maximum window size may be proportional to a ratio of a virtual output queue value for one of the plurality of ingress ports to the total virtual output queue value.

In another example, a method includes storing an egress count level for an egress device, wherein the egress count level relates to pending data transfer, selecting an egress queue based on the egress count level, generating, at a controller, an acknowledgement message corresponding to the egress queue, accessing a size of the data packet in the egress queue, and delaying transmission of a subsequent acknowledgement message for a period of time based on the size of the data packet and an indicator of congestion upstream of the egress device.

Example Embodiments

The following embodiments relate to a transport protocol for data transmission in a data switch, a switched fabric, or another network topology. These examples include multiple nodes in multiple stages that are coupled via switches, such as a crossbar switch.

The term fabric or switch may be used to refer to the network device including the fabric and arrangement of internal nodes or an arrangement of network devices. In either scenario, the arrangement includes multiple paths through multiple nodes from one end to the other. The features described in the following embodiments may be applied to either scenario. The term fabric relates to the grid-like pattern of the crossbar switch that connects multiple inputs to multiple outputs in a matrix arrangement. The crossbar switch may be referred to as a cross point switch or a matrix switch. The crossbar switch may connect M inputs and N outputs, which includes M×N cross points so that each input is selectably connected to each output. The cross points selectably connect the input lines to the output lines. In one example, the cross bar switch may have 100 inputs, 100 outputs, and 10,000 cross points. The cross bar switch may include a network of transistors or other implementations are possible. When the transistor of a cross point is enabled, the input is connected to the output through the cross point.

An arbiter or scheduler prevents multiple inputs from being connected to a single output at the same time and otherwise is configured to control the cross points. The arbiter or scheduler may comprise logic or hardware configured to output a control signal that selectively energizes the cross points. The control signal may activate or energize a transistor at each cross point. A physical connection (e.g., wire or trace) connects the arbiter to each of the cross points. The arbiter decides the order that packets are dequeued from the input queues.

The latency through a data switch should be as small as possible. The fabric bandwidth becomes a scarce resource as port density increases and data flows compete for paths through the fabric. The following embodiments may allow low latency and high port density by efficiently using fabric resources.

Current arbitration schemes require the ingress device (e.g., a line card application specific integrated circuit (ASIC)) to send a request and receive a grant before a data frame may be sent to the destination, which may be referred to as request-grant loop latency. The round trip time for the request-grant loop latency delays the beginning of packet transmission. The following embodiments allow packet transmission to begin immediately. The egress device (e.g., a line card ASIC) arbitrates and manages fabric admission for ingress devices only after the egress device receives packets from ingress. The control feedback allows the system to converge without the need of large excess fabric bandwidth and still allows low latency. Each ingress device is associated with one or more ingress ports, and each egress device is associated with one or more egress ports. In one embodiment, each ingress device includes one ingress port and each egress device includes one egress port. The term ingress port may refer to the ingress device and associated port(s) in combination, and the term egress port may be used to refer to the egress device and associated port(s) in combination.

The ingress device includes relatively large buffers (e.g., 10 megabyte, 500 megabyte, 1 gigabyte). Delays introduced at the ingress device through queuing data packets do not initially result in dropped packets. The ingress device can absorb significant influx of data. However, if there is persistent congestion, the packets accumulate on the ingress device and eventually there may be drops. In the internal network, between the ingress device and the egress device, buffers are smaller (e.g., 10 kilobytes, 100 kilobytes, 1 megabyte). Drops occur internally but may be recovered through retransmission by the ingress device. To the network outside of the data switch, the packet appears to simply have taken a longer time to get through the data switch. The following embodiments send packets through the data switch with the possibility that drops occur but may provide quick recovery when packets are dropped. However, when the possibility that drops occur is high, data packets are not sent and the ingress device waits for a better time to send the data packets.

FIG. 1 illustrates an example network for internal communication in a switch. The data switch includes inputs 10a, 10b, which may be referred to as ingress devices, and outputs 11a, 11b, which may be referred to as egress devices. Between the inputs 10 and the outputs 11 is a crossbar fabric, which includes a first stage having first stage nodes 100a, 100b, a second stage having second stage nodes 102a-n, 103a-n, and a third stage having third stage nodes 104a, 104b. Data packets are received at the inputs 10 and communicated through the switch to the outputs 11. The inputs 10, outputs 11, and crossbar fabric may be arranged to form a Clos network, as shown unfolded in FIG. 1, or another arrangement may be used. Other numbers of nodes, stages, inputs, and/or outputs may be provided.

The ingress devices source data packets into the crossbar. The egress device is the destination of those data packets and may be referred as destination. The ingress and egress devices may be physically implemented in the same ASIC. The links, which are shown by arrows in FIG. 1, are bidirectional. The data packets may include data frames and control frames. The data frames may move left to right in the network shown in FIG. 1 and the control frames may move in the opposite direction, from right to left.

One or more of the inputs 10 may include multiple virtual output queues. The virtual output queue may be assigned to an egress device, and the inputs 10 may include multiple virtual output queues assigned to different egress devices. Because the ingress devices include a virtual output queue for each egress device, each ingress device can communicate with different egress devices independently, and the data frames belonging to each flow can be load balanced independently. Since load balancing entails out-of-order packet delivery, the egress device reorders the data frames sourced by each ingress communicating to egress device.

The initial request-grant loop latency is eliminated because at least one source (e.g., ingress device) is configured to send a certain number of bytes without waiting for an acknowledgement message (ACK) to be received from the output or destination. The source also sends the certain number of bytes without first generating a request to send data. After sending this initial burst, the source may be configured to wait for one or more ACKs before proceeding with further data transmission. For example, each source may receive a window that defines how many bytes (or data packets) may be sent immediately as packets arrive. When the window becomes full, the source may wait for an ACK to be received. The receipt of the ACK triggers the window to slide. In response to more space in the window, the ingress device is configured to send more packets.

A destination sends acknowledgement to different sources at a predetermined rate. The rate may be selected to be just enough to maintain the output buffer occupancy of the destination. In one example, the rate is selected to keep the output buffer about half full. Accordingly, congestion in the fabric is avoided even during bursty traffic. The destination may send acknowledgements faster than the port speed when the buffer is empty and gradually slow down to the port speed when buffer is half full.

At the fastest setting, the destination sends ACKs that result in an aggregate arrival rate at the egress device that is still lower than a corresponding share of the fabric capacity. This allows the right amount of data to get into the fabric, and the rate at which the data enters to be smoothed out, reducing the queuing delay in the fabric to a minimum. If the total traffic going to a destination is less than the port rate, the output buffer remains empty or little data is buffered, so low latency is achieved.

Figure 2:
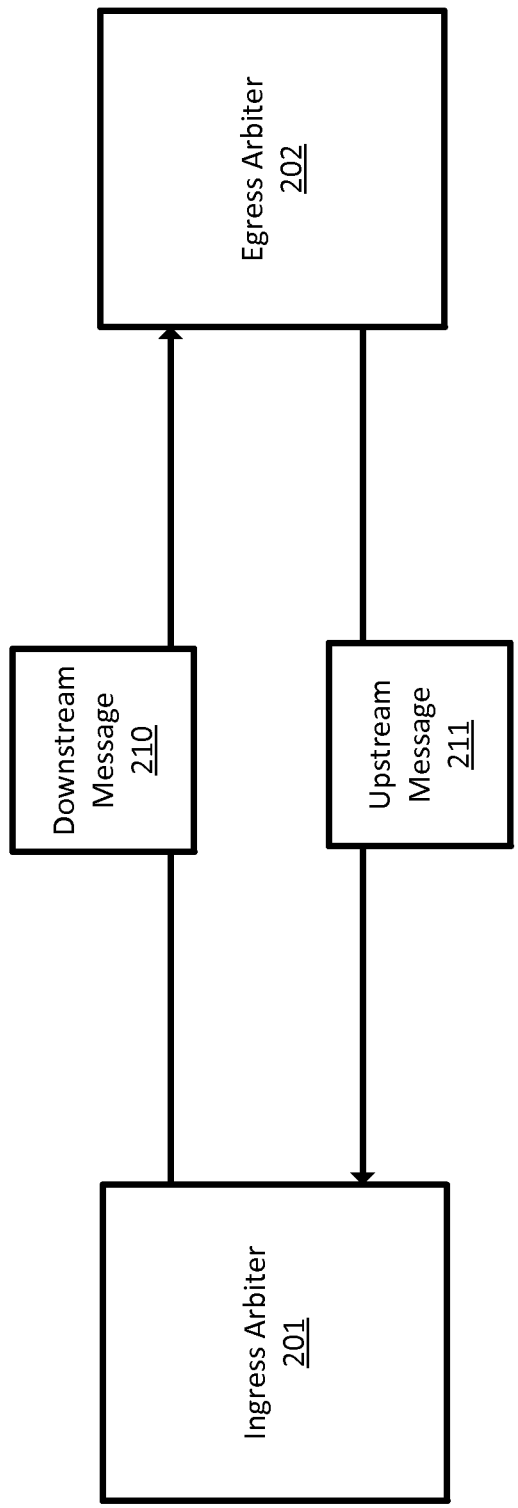
FIG. 2 illustrates communication between an input and an output in the network of FIG. 1.

FIG. 2 illustrates communication between an input and an output in the network of FIG. 1. For example, each input 10 may include an ingress arbiter 201 and each output 11 may include an egress arbiter 202. Messages generated at the egress arbiter 202 and sent to the input 10 are referred to as upstream messages 211. Messages generated at the ingress arbiter 201 and sent to the output 11 are referred to as downstream messages 210. Several examples of downstream messages 210 and upstream messages 211 are described below. The ingress arbiter 201 and the egress arbiter 202 may be implemented using a single controller or separate controllers.

The data packets making up the data flow are one example of a downstream message 210. The ingress arbiter 201 is configured to send data packets to the outputs without first receiving permission from the outputs. However, such speculative data packet transmissions are sent only at specific times when congestion is unlikely to result. For example, the speculative data transmission may occur when a current window size is less than a maximum window size. The maximum window size may be calculated by the controller according to a bandwidth and a round trip time from the ingress device to the egress device. The bandwidth may be a known property of the device or selected by a user input. Less than the maximum window size may be allocated to the ingress device.

The controller may receive a virtual output queue value for each of one or more ingress ports. The virtual output queue values describe an amount of data at one of the ingress ports destined for an egress port. The controller calculates an assigned window value for the one of the plurality of ingress ports based on the maximum window size and the virtual output queue value for the one of the plurality of ingress ports. Based on the assigned window value, the controller generates an acknowledgment message including the assigned window value for the one of the plurality of ingress ports.

Figure 3:
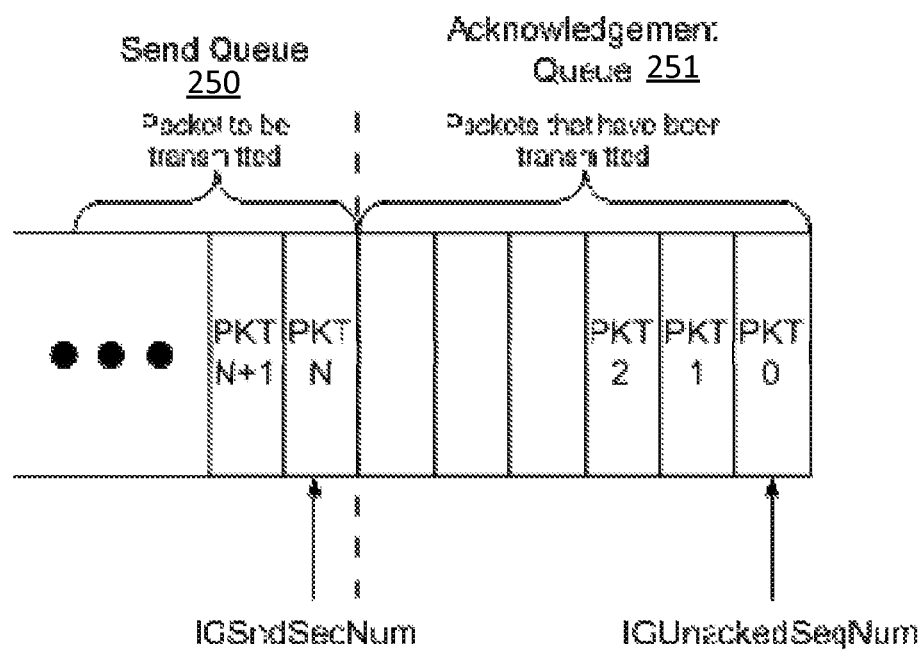
FIG. 3 illustrates an example ingress sequence of the input of FIG. 2.

FIG. 3 illustrates an ingress sequence. The ingress arbiter 201 stores a send queue 250 and an acknowledgement queue 251. The send queue 250 and the acknowledgement queue 251 may be stored in separate memories or a single memory. The acknowledgement queue 251 may include entire packets or a listing of packets. The acknowledgement queue 251 includes sent packets from PKT 0 to PKT N−1. The next packet to be sent from the send queue 250 is PKT N, and other packets may be in line, such as PKT N+1 and so on. The current window may be defined as the sum of the sizes of packets 0 to N−1. The maximum window size may be defined according to a bandwidth of the destination and a round trip time from the ingress device to the egress device and adjusted according to an adjustment factor. In other words, the maximum window is the amount of time for a data packet to travel from the ingress device to the egress device and an ACK to return from the egress device to the ingress device, multiplied by the bandwidth or capacity of the destination, and adjusted by the adjustment factor. The adjustment factor may be an indication of congestion in the fabric. The adjustment factor may be determined by the egress device through algorithms discussed in more detail below. The packet labeled IGSndSeqNum is the packet that will be used for the next packet sent for the flow. The packet labeled IGUnackedSeqNum is the packet that is the next packet in sequence for which the ingress device is waiting to receive an ACK.

The current window size may be measured in bytes or maximum transmission units (MTU). The maximum window size may be a predetermined number of bytes with a remainder set at 1 MTU. For example, consider a maximum window size of 1100 bytes and a series of packets each having 500 bytes. If two 500 byte packets are sent, and the next packet is 500 bytes, there is not space in the window for the entire third packet. However, the ingress arbiter 201 may send the packet anyway. In other words, packets are sent unless the maximum window size is met or exceeded. The ingress arbiter 201 overshoots the maximum window size as much as one MTU. If the maximum window size less the current window size is greater than 0, the ingress arbiter 201 sends another packet from the send queue 250. Other window space approaches may be used. As acknowledgement messages are received from the egress arbiter 202, the ingress arbiter 201 removes packets from the acknowledgement queue 251, which allows packets to slide over from the send queue 250.

Figure 4A:
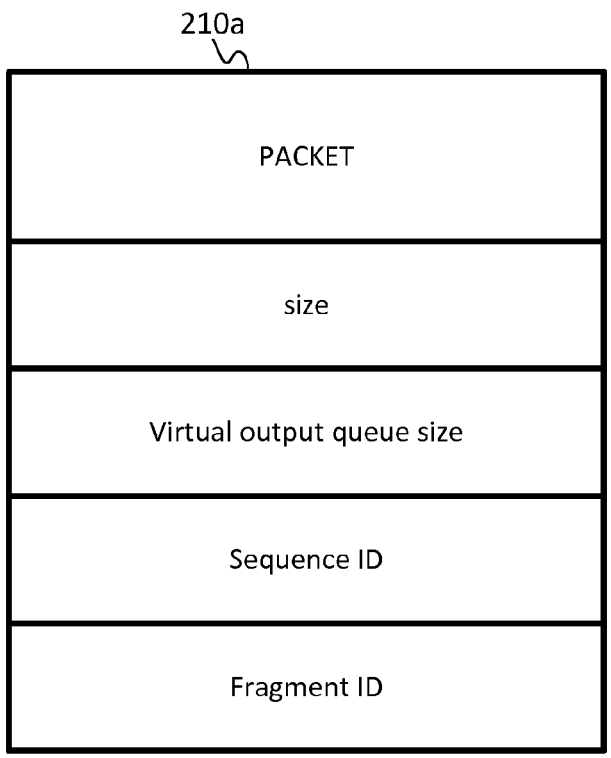
FIG. 4A illustrates an example of a data packet.

FIG. 4A illustrates an example of a data packet 210a of a flow. Data packet 210a is not a control message. In addition to a payload and routing information, the data packet 210a includes a size field, a virtual output queue size field, a sequence number or ID, and a fragment number or ID. The routing information may include a source address, a destination address and priority information. Different formats and/or information may be included or not included.

The sequence ID indicates the position of the data packet in the data stream. The egress device uses the sequence number to reorder packets. The sequence ID is used for ordering the packets and assembling the packets. When the egress device receives packets, the packets may be reordered according to the sequence ID before sending to the port and away from the data switch. The sequence ID is also used to implement the sliding window based congestion control. The egress device extracts the sequence IDs from the data packets received and inserts the sequence IDs into the ACKs. When the ingress device receives an ACK, the ingress device determines which packet is being acknowledged according to the sequence ID in the ACK.

The virtual output queue size field stores a VOQ length. The VOQ length may be used to determine the maximum window size or a share of the maximum window size that is assigned to each ingress port. Data packets are stored in virtual output queues in the ingress, and each of the virtual output queues corresponds to one of the possible egress devices. There may also be multiple virtual output queues, each corresponding to a different priority class, at one ingress device for one of the egress devices. The virtual output queue size field includes data indicative of the current size of the virtual output queue from which the data packet came.

The egress device is configured to generate a window assignment according to the current size of the virtual output queue. The window assignment may be generated for each virtual output queue in order to appropriately share the capacity of the output link, which is discussed in more detail below.

The fragment ID identifies the data packet as a multi-part data packet. Packets that are above a maximum size level (e.g., 2,500 bytes) must be broken up into fragments by the data switch. The ingress device assigns the fragment ID (e.g., part 1 of 4) to each of the portions of the oversized data packet. The egress device reassembles the data packet based on the fragment IDs. The sequence ID and fragment ID may be combined into a single alphanumeric or binary value. The oversized packet may be a superframe made of multiple network packets, which are sourced by one of the virtual output queues.

The data packet 210a may also include a maximum queue field. Each of the nodes in FIG. 1 maintains a queue level indicative of the amount of data recently traversing the node. The queue level may be a virtual queue or a shadow queue in that the queue level lags in time the actual transit of the data packets. When the data packet 210a reaches a node, the maximum queue field is written with the queue level of the current node. Subsequent nodes compare their queue levels with the maximum queue field and overwrite the maximum queue field if their queue levels exceed the value currently stored in the maximum queue field. Accordingly, the data packet 210a acquires the largest queue level met along the way. The egress device is configured to extract data from the maximum queue field to determine whether and to what degree congestion is likely in the crossbar.

Figure 4B:
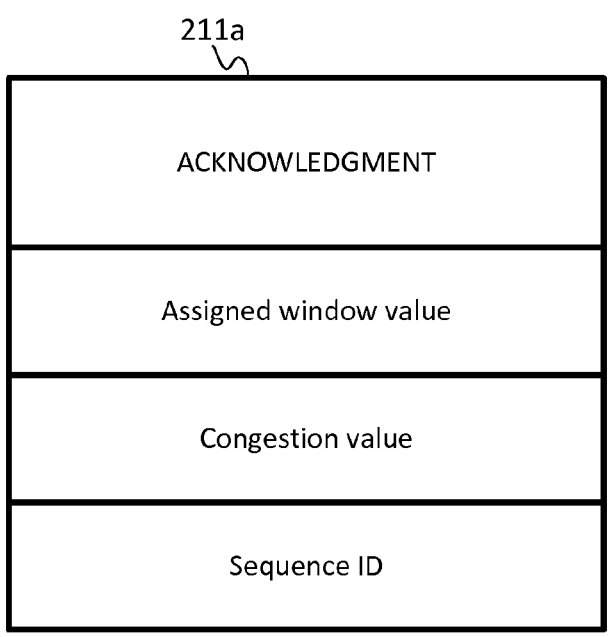
FIG. 4B illustrates an example of an acknowledgement message.

FIG. 4B illustrates an example of an acknowledgement message 211b. The acknowledgement message 211b includes an assigned window value, a congestion indicator or value, a sequence ID, and routing information. The routing information may include a source address, a destination address, and priority information. Additional, different, or less information may be included. The acknowledgement message 211b is a message from the egress device to the ingress device alerting the ingress device that a packet including the sequence ID has been received. The ingress device may also assume that all packets having preceding sequence IDs have also been received. Therefore, the ingress device may remove every packet from the acknowledgement queue 251 with a sequence ID less than or equal to the sequence ID received in an ACK. Accordingly, the window slides to the left, and more data is sent from the send queue 250.

The assigned window value is data that indicates to the ingress device the maximum window size that the ingress device should be using. The assigned window value may be a number of bytes of data that the ingress device can send out before waiting for corresponding ACKs to be returned from the egress device. The assigned window value may be assigned proportional to the virtual output queue sizes. The assigned window value may be assigned using another algorithm based on the maximum window size and recent allotments, which is discussed in more detail below.

The congestion value or congestion indicator indicates whether the egress device or fabric is experiencing congestion. The congestion value may be a single bit (e.g., 1 indicates a threshold level of congestion at any location and 0 indicates no problematic congestion). In another example, the congestion value may be a multibit value, which specifies whether the egress device or the fabric is experiencing congestion, how much congestion has been detected, or a specific location in the fabric. The congestion may be congestion of data packets between the ingress device and the egress device, which includes paths upstream of the egress device. The ingress device may be configured to generate and send probe messages based on the congestion value, which is discuss below in more detail.

Because the acknowledgement messages ultimately control how much data is released by the ingress device, the egress device controls the rate each source can inject data into the fabric by controlling the timing of the ACKs. The bandwidth of the device times the round trip time through the device defines the bandwidth-delay product as the maximum window size needed to achieve the bandwidth. The maximum window size may be larger than the minimum bandwidth-delay product requirement. However, in the long term, a source rate cannot deviate from the rate at which the left edge of the window is advanced. If the ingress device uses all of the maximum window size, then the two rates are identical, and the egress device has control not only of the rate, but also of the actual time at which packets are injected into the fabric. When the ingress device, for any reason, does not immediately use all of the window, then bursts of a magnitude up to equal to the maximum window size are possible. The rate property however is maintained on average. The egress device can balance the rates of all sources according to egress port speed and egress buffer occupancy. When the egress buffer occupancy is low, the egress device generates ACKs at a slightly faster pace. When the egress buffer occupancy exceeds a threshold level, the egress device generates ACKs at a slower pace. Accordingly, the egress buffer occupancy is maintained at or near target levels without too much data entering the fabric and causing congestion.

In addition, the congestion value may indicate whether the egress device that generated the acknowledgement message 211a is experiencing congestion. The congestion value is a message from the egress device to the ingress device informing that ingress that if more data packets are sent, congestion may result. The ingress device is configured to stop or slow the transmission of data packets for a time period (e.g., 10 milliseconds, 1 millisecond, or another configurable time period.)

Alternatively, the egress device may be configured to generate a separate congestion broadcast message. The congestion broadcast message may include a port congestion value. The port congestion value may be a single bit value that is on or off, or the port congestion value may be multi-bit to indicate a degree of congestion. The congestion broadcast message may be transmitted from the egress device to all ingress devices. The congestion broadcast messages cause the ingress device to stop speculating when sending the initial burst of data packets. That is, for a predetermined time period after receiving a congestion broadcast, ingress devices do not send data packets without first receiving an acknowledgement message from the respective egress devices. The predetermined time period for a congestion broadcast to expire at the ingress device includes examples such as 50 microseconds, 1 ms, or 10 ms.

The egress device may be configured to wait a congestion wait time period before repeating the congestion broadcast in order to save bandwidth in the fabric. The egress device may also be configured to wait a non-congestion wait time period before determining whether congestion has begun. The egress device includes one timer to measure the congestion wait time period and another time period to measure the non-congestion wait time period. The congestion time period is less than the non-congestion time period by a predetermined factor (e.g., 10, 100, 1000, or any integer).

FIG. 5A illustrates an example probe message 210b. The probe message 210b is generated by the ingress device and sent to the egress device. The probe message 210b communicates to the egress device that the ingress device has a packet to send when a new flow comes into existence. The probe message 210b includes a packet size and a sequence ID. The packet size is data indicative of how much data the ingress device is requesting to send to the egress device. The packet size may be the size of the next packet in the send queue 250. The packet size may be the total size of any number of packets in the send queue 250.

At times when probe messages are used, a probe message may be sent for each data packet, or only for the first packet in a burst. The probe messages contribute minimally to congestion because the probe messages are small. The probe messages may also be sent with high priority such the probe messages can be transmitted through congestion in the fabric.

The ingress device may be configured to generate probe messages when congestion levels are high. The congestion level may be determined from a recent acknowledgement message 211a. The ingress device may compare the congestion level to a threshold level. When the congestion level exceeds the threshold level there is speculation that using the maximum window size would result in fabric congestion. The probe message 210b informs the egress device of the existence of the flow, and the egress device can properly regulate the flow. A probe message 210b may be dropped by the fabric or egress device and recovered using the same mechanisms as a normal data packet. The acknowledgement message 211a generated in response to the probe message 210b may allow sending of several packets (e.g., when a small number of flows are present).

The ingress device may be configured to generate probe messages in several scenarios. As described above, the probe messages may be generated when received congestion values indicate congestion or exceed a congestion threshold. The congestion may be indicated by a single bit set to one.

In addition, when an established flow experiences timeout and becomes inactive and if there is no packet to send for an elapsed time, a new packet may not be sent until a probe is sent and acknowledged in order to re-establish the flow. In one example, any packets requiring fragmentation that are sent after a period of inactivity require a probe message and corresponding acknowledgment. Fragmented message are particularly susceptible to congestion. Accordingly, fragmented packets may be handled with no speculation in the intra switch transport protocol.

In one embodiment, the probe message may be triggered only when there is an indication that congestion is present and a time requirement has been met. The time requirement may specify that the default window is still being used. The default window is used until the first ACK after an idle period is received at the ingress device. The time requirement may be met when the virtual output queue for the egress device is empty or near empty, all sent packets have been acknowledged, and a predetermined waiting time period has elapsed since the last ACK has been received.

The indication that congestion is present may be included in the congestion value of the acknowledgement packet 211a. The congestion indication may be a per-flow congestion status bit configured to indicate evidence of fabric or destination congestion. Because the congestions indication is communicated through the ACKs, zero or limited additional bandwidth is consumed.

The per-flow congestion status bit may be set by the egress device in either acknowledgement or re-transmit request messages, or both. The ingress device receives and stores the congestion status bit according to the associated egress device or virtual output queue. The per-flow congestion bit may be reset after a reset time period elapses, indicating inactive flows.

The congestion indication may be a per-destination port congestion status set by the egress devices. An egress device may broadcast a congestion message including a per-destination port congestion bit to all ingress devices or all sources. Immediate congestion in a flow that has been inactive can still be detected and prevented from overflowing the fabric. The per-destination port congestion statuses from multiple destinations are stored by the ingress device in a bitmap. Accordingly, at any given time, the bitmap at each ingress device includes the last congestion status received from each destination.

The ingress device is configured to cease sending packets to destinations marked as congested in memory based on past messages. In one example, the ingress device instead generates and sends a probe when a packet is waiting for a destination listed as congested. The ingress device continues sending to the destination only upon reception of the probe ACK. The ingress device may store a bitmap of congestion values for the set of egress devices coupled to the ingress device.

As a bit of a compromise between speed and risk of congestion, if the egress device determines that there is a risk of fabric drops or egress drops for all packets traveling to the affected destination, then the egress device broadcasts this information to all sources. The per-flow congestion status instead is set based on total VOQ Length being above a threshold. If the sum of the flows of a certain priority converging on an output is sufficient to create congestion, then those flows cannot experience minimal latency, and there is no latency penalty if each sends a probe after even a short idle period.

Probes may be used to avoid congestion when certain conditions that tend to cause fabric congestion occur. These conditions may include using an ingress default window to send packets when flow is not yet established with egress, overshooting the assigned window by a one packet at the ingress device, and varying the packet size (more data than expected by egress device is sent), using a stale assigned window because the flow was idle.

The ingress device is configured to start a window timer when the last pending ACK is received. The ingress device continues the use the assigned window value until the window timer expires. If the timer expires, the ingress device reverts to the ingress default window size. The time is variable. If the default window size is set as a large value, setting the timer higher results in more conservative behavior, because the transient effects on the flow last longer, as compared to a low window value assigned by egress. Setting the timer lower results in a flow reverting earlier to the default window size. If the default window size is small, then the significance of the timer is reversed. By default, the algorithm is not aggressive, and setting the timer to a low value is the least aggressive option, while setting the timer to a high value causes the ingress device to use a possibly high assigned window for longer time.

FIG. 5B illustrates an example retransmit request 211b. The retransmit request 211b includes a congestion value, which may be similar to that if the acknowledgement message 211a. The retransmit request 211b also includes a sequence ID that specifies a packet that should be transmitted again. The retransmit request 211b also includes routing information including a source address, a destination address and priority information.

The egress device detects whether a packet has been dropped in the fabric or otherwise misrouted by detecting gaps in a listing of packet sequence numbers. The retransmit request 211b is a request for the ingress device to send the missing packet again. The retransmit request 211b could be the result of the egress device receiving a drop notification message from the fabric. Alternatively, the missing packet could result from a drop performed by the egress device or due to a timeout of the egress device. Retransmit requests enable destinations to explicitly request for retransmission at a desired pace. The advantage, compared to retransmits decided unilaterally by the ingress device, is the ability to regulate the influx of packets to the fabric and avoid further congestion.

FIG. 5C illustrates an example drop notification message 210c. The drop notification message 210c includes a sequence ID of the packet that was dropped. The drop notification message 210c may also include a fragment ID and fragment size when the packet was divided into multiple parts. The drop notification message 210c also includes routing information including a source address, a destination address and priority information. The drop notification message 210c may be generated by the cross bar and sent to the egress device or generated by the egress device.

In response to receiving the drop notification, the egress device may forward the retransmit request message 211b to the ingress device, which will transmit the packet again. This keeps the control loop intact and helps recover faster from packet drops (instead of relying only on ingress timer set based on worst case delay in fabric). The drop notification message carries the size of packet that was dropped. Of course the fabric cannot guarantee delivery of the drop notifications, so ingress timers may also be used.

Figure 6:
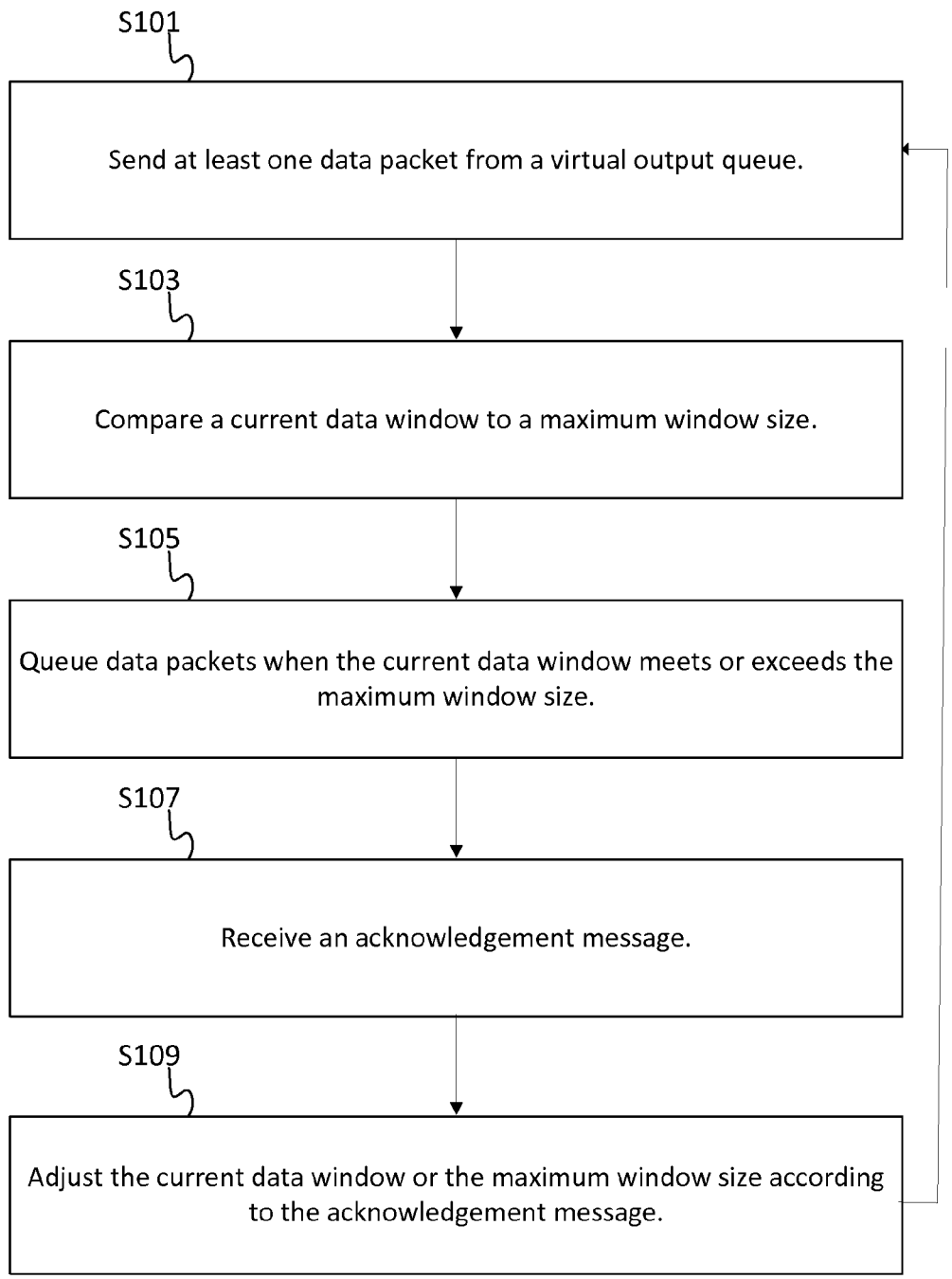
FIG. 6 illustrates an example flow chart for operation of the ingress.

FIG. 6 illustrates an example flow chart for operation of the virtual output queue arbiter, which is an example ingress device. The ingress VOQ arbiter selects amongst ingress queues competing for access to the fabric crossbar and determines when a given VOQ can send and how much data it can send.

At act S101, the ingress devices sends out at least one data packet from the ingress VOQ without sending any requests to send or without any delays for an acknowledgement. The ingress VOQ may continue to send additional data packets, while accumulating a measure of the total amount of data sent in a current data window value.

There are four example circumstances when a VOQ is considered eligible to continue to send packets. One example occurs when the ingress VOQ has not yet transmitted the maximum window size. This may happen as the flow is established for the first time, or if the established flow has timed out causing any last allocated window by destination to be invalid. At act S103, the ingress device compares the current data window to a maximum window size.

The maximum window size may be variable and may be set initially according to a default maximum window size and subsequently according to an assigned window value from an acknowledgement packet 211a. If the used window is less or equal than ingress default window, the VOQ is eligible. When the ingress default window is used, an additional packet based cap may also be applied. The ingress default window could be defined by a number of bytes, a number of packets, or both. At act S105, the ingress device queues data packets when the current data window meets or exceeds the maximum window size.

Another example includes what may be referred to as normal transmission. The ingress VOQ is eligible to send if it is non-empty and the current window (amount of data sent but not yet acknowledged) is less or equal than the maximum window size, as determined at act S103. The equality constraint means a source is allowed to overshoot the assigned window size by one MTU. This prevents ingress deadlock when the assigned window is smaller than the packet size. When a large number of flows compete for the same output, the output may assign a very small window (even 0) to all inputs. With this relaxed rule, instead of all ingress being deadlocked, each is allowed to send at least a packet. At act S105, the ingress device queues data packets when the current data window meets or exceeds the maximum window size.

At S107, the ingress device receives an acknowledgement message from an egress device. The ingress device is configured to extract the sequence ID from the acknowledgement message in order to identify the current data window associated with the egress device. Accordingly, the ingress device adjusts the current data window according to the acknowledgement message. As shown in act S109, the current data window may be decreased by the size of the packet specified in the acknowledgement message. In addition or in the alternative, the ingress device is configured to extract the assigned window value from the acknowledgement window. The maximum window size may be adjusted according to the assigned window value of the acknowledgement message in act S109.

The third example occurs when the ingress VOQ has experienced a timeout. The ingress VOQ may experience a timeout when waiting for acknowledgement message to be received from the destination. The ingress device is configured to schedule re-transmission of data for a specific sequence ID or range of sequence IDs. In one example, only the oldest sequence ID that has yet to be acknowledged is retransmitted.

The fourth example occurs after receipt of a retransmit request. When the ingress device receives a retransmit request from the egress device, the ingress device sends the corresponding data packet again, according to the sequence ID included in the retransmit request. The ingress device may be configured to maintain normal send queue and a retransmit queue to allow sending either from normal send queue. Transmission only happens from the head of either queue. Any packets transmitted from the send queue are appended to tail of retransmit queue. Packets are deleted from the head of the re-transmit queue once corresponding sequence number is acknowledged, which happens when sequence number in the ACK is the one immediately following the packet.

Figure 7:
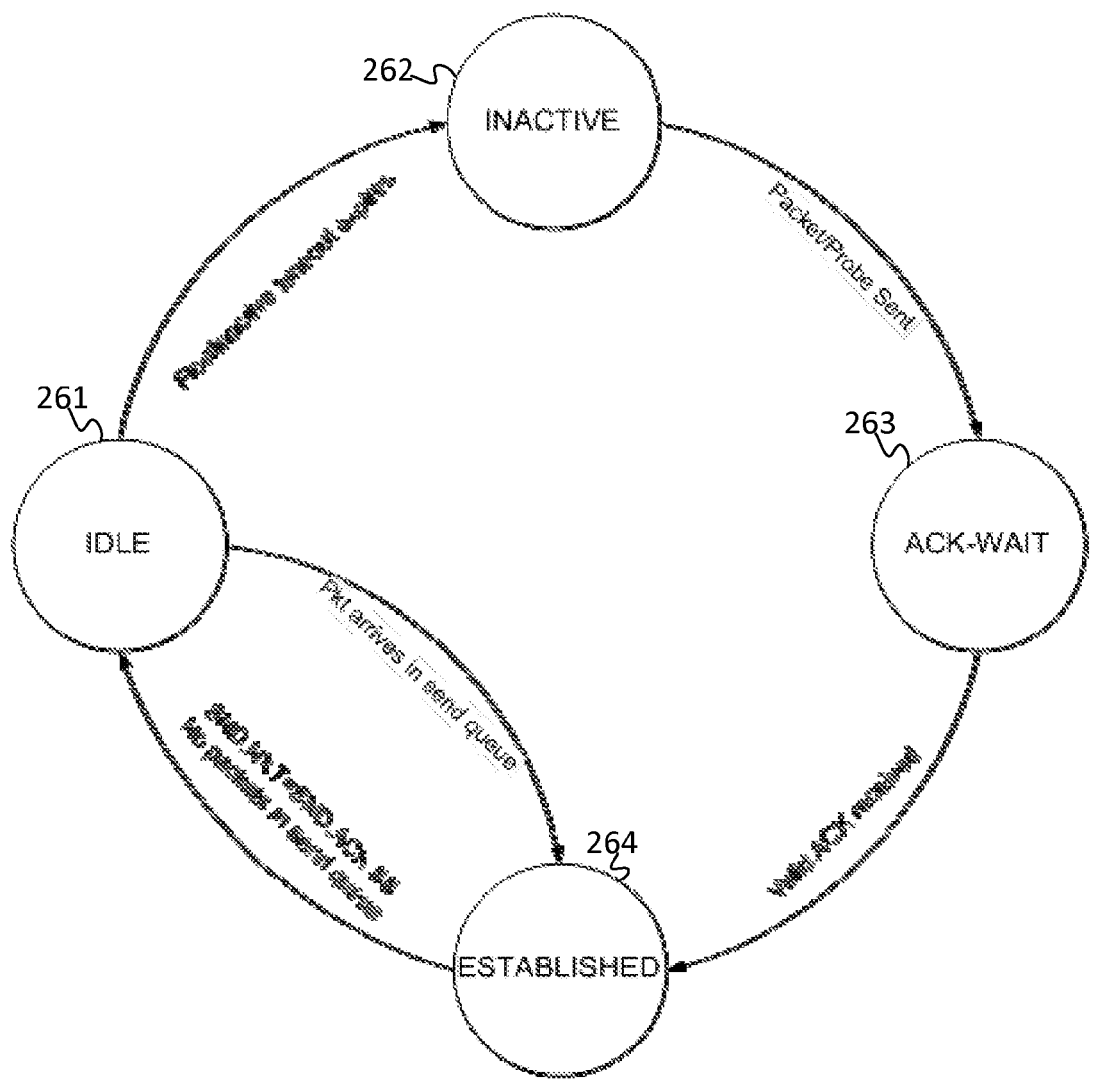
FIG. 7 illustrates an example state diagram for the ingress.

FIG. 7 illustrates an example state diagram for the ingress arbiter. The ingress arbiter includes at least four states: an idle state 261, an inactive state 262, an ACK wait state 263, and an established state 264. The inactive state 262 occurs when either no packets have been transmitted for this flow or the flow has been in the idle state 261 for a period of time greater than the inactive timeout period.

The ingress arbiter transitions from the inactive state 262 to the ACK wait state 263 when one or more packets have been transmitted to the egress device and the ingress device is waiting for an ACK to return from the egress device. The packets may be data packets of the flow or probes.

The ingress arbiter transitions from the ACK wait state 263 to the established state 264 when the first valid ACK message is received from the egress device. At this point the maximum window size for the flow has been established. The ingress arbiter moves from the established state to the idle state 261 when no packets have been sent that are yet to be acknowledged and there are no pending packets to send. The ingress devices returns to the established state 264 if any packets are received in the send queue. If the current window is empty and no new packets arrive for a predetermined idle time period, the ingress device returns to the inactive state 262. The predetermined idle time period may be configured between 10 microseconds and 1 millisecond.

The acknowledgement message 211b includes the assigned window value, which is data that indicates to the ingress device the maximum window size that it should be using. The assigned window value may be determined by the egress device. The assigned window value limits the maximum sending rate of the ingress device, while the sliding rate of the window (controlled by how frequently ACKs are sent by the egress device and received by the ingress device) controls the sending rate of the ingress device. The egress device, as the egress device acknowledges data reception, dynamically assigns the assigned window values to the ingress devices. As discussed above, the egress device is configured to extract the VOQ length information from data packets and assign a window to each ingress device in manner based on the VOQ lengths, such as proportional to the VOQ lengths. In addition, the egress device is configured to calculate the assigned window values according to recent data flows.

Figure 8:
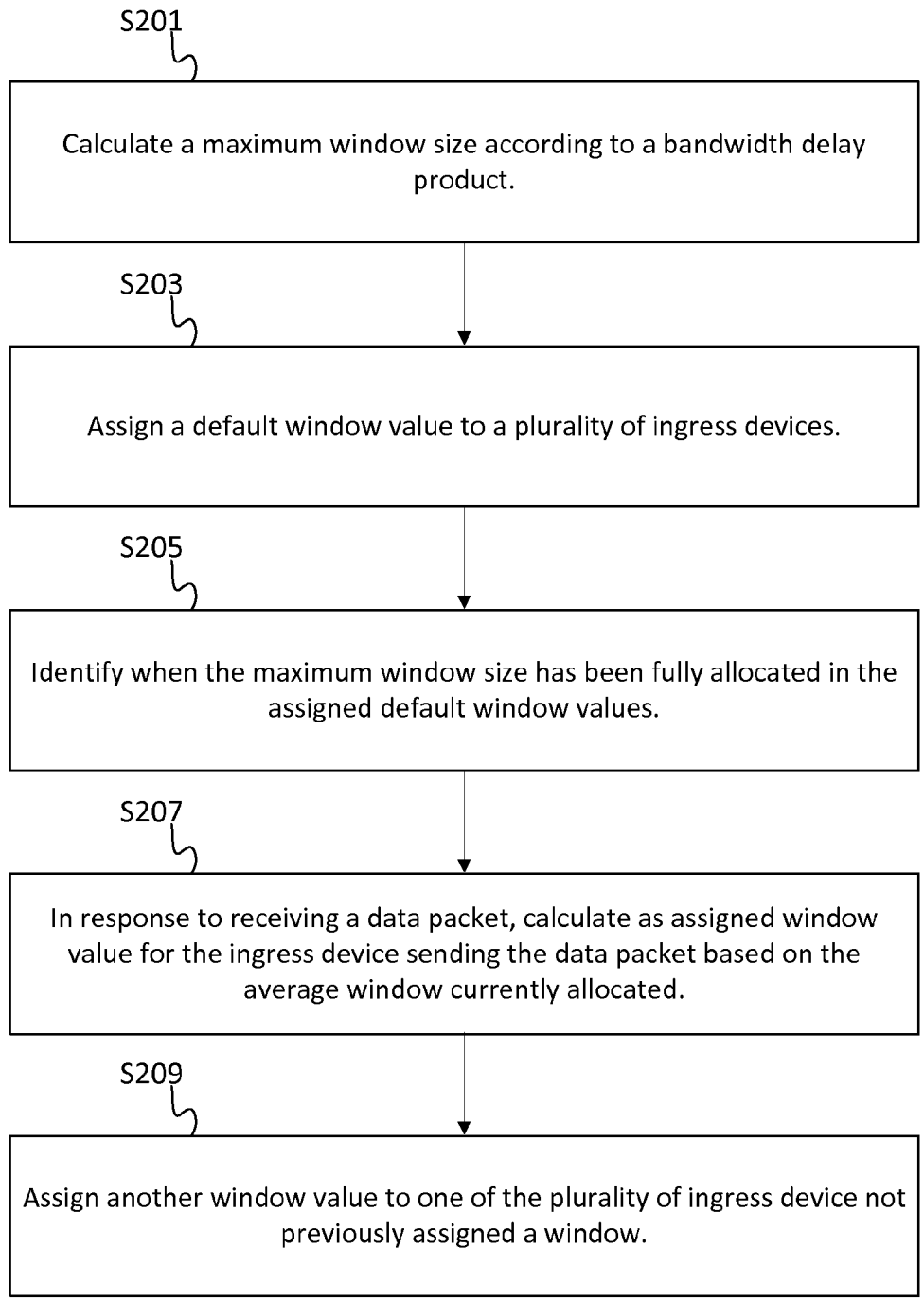
FIG. 8 illustrates an example flowchart for window assignment.

FIG. 8 illustrates an example flowchart for determination of the window values according to recent flow values. Additional, fewer, or different acts may be included. The acts of FIG. 8 may be combined with the assignment of window values according to VOQ lengths discussed above.

At act S201, the egress device calculates a maximum window size according to a bandwidth delay product for the device. The bandwidth delay product may be the bandwidth of the device multiplied by the round trip time between ingress and egress devices. Other calculations using the same or different variables may be used. The roundtrip time is the smallest possible amount of time from when a data packet leaves an ingress device until an acknowledgement message is received at the ingress device. The maximum window size is assigned so that the ingress device is always assigned equal to or less than what is required by a single source to achieve full rate. If a time greater than the bandwidth delay product is used for the maximum window value, no greater speed is achieved by the device, but the risk of congestion increases. If only one ingress device is assigned to the egress device, the maximum window size may be used as the assigned window value. However, multiple ingress devices may be sending flows to the egress device.

At act S203, the egress device assigns an egress default window value to a plurality of ingress devices. The assignments are made sequentially as data packets are received and acknowledgement messages are generated and returned to the ingress devices. The egress default window may be calculated by dividing the maximum window size across the plurality of ingress devices. However, the number of ingress devices may not be initially known. The egress device may assign a predetermined default window size to ingress devices as data packets are received. The default window size may be a percentage or other function of the bandwidth delay product (e.g., 10%, 20%, or any percentage up to 100%). The default window size may be used after a period of inactivity (e.g., 50 microseconds, 100 microseconds, 1000 microseconds, or any value). Because the window size available to all ingress devices is limited, the maximum window size is a window pool that is allocated and reclaimed from ingress devices as data packets traverse the device.

One example scenario includes a maximum window size of 50 kilobytes. There are six ingress devices with queues for the egress device. The egress default window size is set to 10 kilobytes. When the egress device receives a data packet from a first ingress device, the egress device generates an acknowledgement message including an assigned window value of 10 kilobytes. The egress device repeats this assignment for the second, third, fourth, and fifth data packets received such that each ingress device is assigned 10 kilobytes. However, if a sixth ingress device has data packets to send, the sixth ingress device cannot be assigned any window because no additional space is in the maximum window. The egress device is configured to identify when the maximum window size has been fully allocated in the assigned default window values, at act S205. No additional window is assigned until a data packet is received from an ingress device.

When data packets are received from ingress devices that were originally assigned window values, the egress device reclaims that portion of the maximum window size and returns the portion to the pool of available window. However, when assigning a second window value to the ingress device, the egress device does not allocate the default window size again. Instead, the egress device calculates the average windows size allocated across the plurality of ingress devices with virtual output queues for the egress device. This calculation considers those ingress devices that have been allocated no window.

Returning to the example above, when a data packet is received from one of the first five ingress devices, the egress device reclaims 10 kilobytes. However, in the subsequent acknowledgment message, the egress device does not assign all 10 kilobytes back to the ingress device. The egress device assigns a maximum of the average window allocated. The average window allocated in this example is 50,000/6, or 8.33 kilobytes. At act S207, the egress device is configured to, in response to receiving a data packet, calculate as assigned window value for the ingress device sending the data packet based on the average window currently allocated.

Subsequently, if the sixth ingress device, which was previously assigned no window value, requests to send a data packet, 1.77 kilobytes may be allocated to the sixth ingress device. Because each ingress device is allowed to overshoot by one packet, the sixth ingress device sends at least one data packet. At act S209, the egress device assigns another smaller window value to one of the plurality of ingress device not previously assigned a window. The smaller window value is less than the default window value.

The process repeats as additional data packets are received. Generally, the egress device continues to give to each ingress device an assigned window value that is no more than the average available in the past. After several rounds of assigning window values to each ingress device, an equilibrium is reached. The sum of the windows assigned to the sources sending to a destination is approximately equal to the bandwidth of the destination times the round trip time of the flows. The destination, after receiving in-order data, selects one flow among the set of flows that need to be acknowledged, assigns a window to it, and generates one acknowledge, making the window of the selected flow slide by one packet.

Every time an acknowledgement message is generated, the egress device updates the maximum window size available to assign to the ingress devices. Throughout the process above, when the assigned window is not used by the ingress device for a period of time, the assigned window is reclaimed by the egress. The time out setting should be at least one round trip time (RTT).

The window allocation process may be performed individually for priority classes of data packets. The egress device maintains an average available window amount per priority class. The average is maintained by feeding the instantaneous available window to a first order filter. The instantaneous available window is simply the sum of the reserved and shared available window pool, if the shared available window pool is positive, and equal to the reserved pool if the residual shared became negative.

Figure 9:
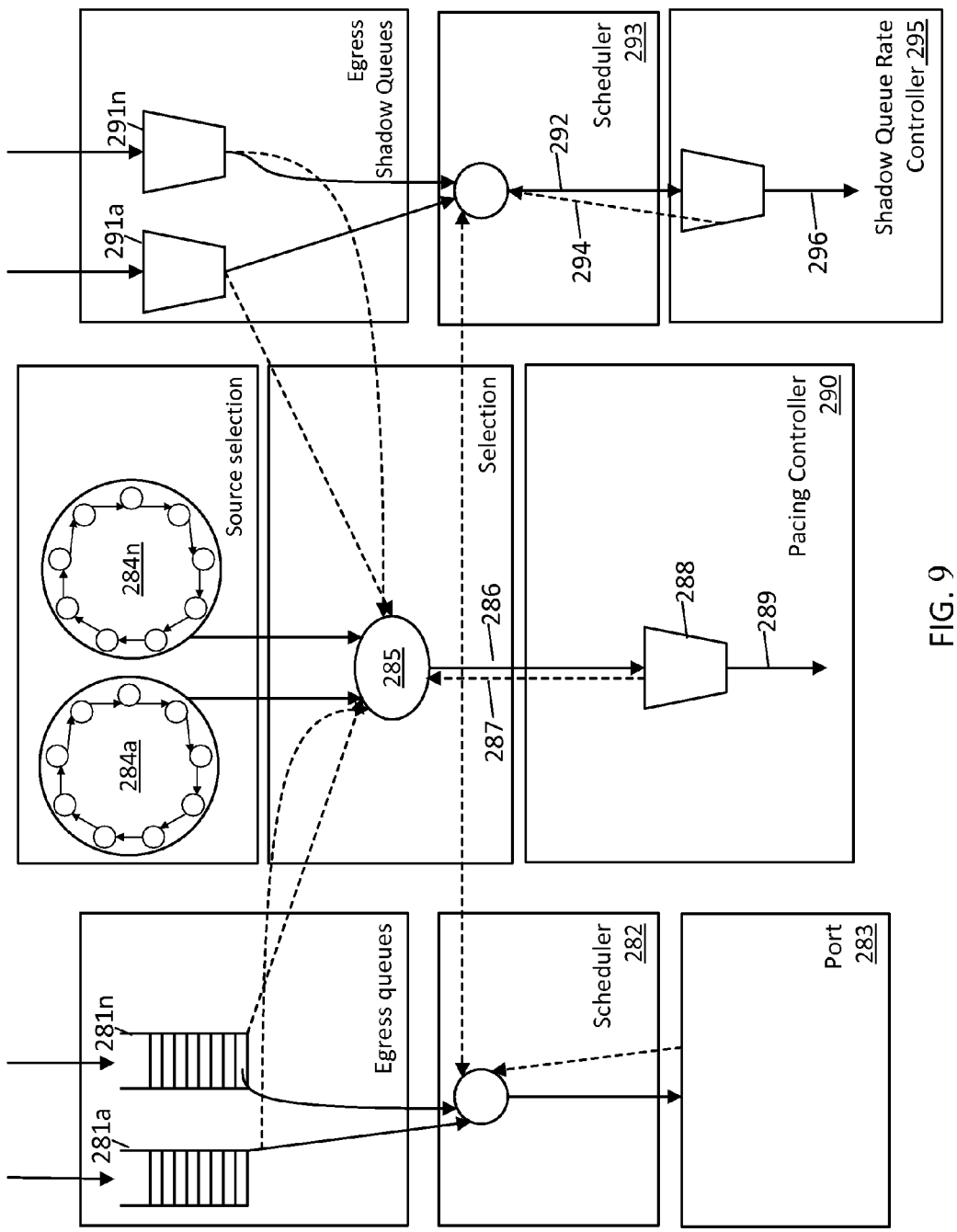
FIG. 9 illustrates an example block diagram of an egress device

FIG. 9 illustrates additional operation of the egress device or an egress arbiter included in the egress device. The egress device is configured to acknowledge packets and calculate window sizes for the ingress devices as discussed above. Accordingly, the egress device controls how fast packets are sent through the switch. The operation of the egress device is performed by a controller. FIG. 9 illustrates some of the operations of the egress device in a logical diagram including egress queues $281a$-$n$, a scheduler $282$, an egress port $283$, source selection mechanisms $284a$-$n$, a selection device $285$, a pacing controller $290$, egress shadow queues $291a$-$n$, a scheduler $293$, and a shadow queue rate controller $295$.

The forwarding of data packets from the device is performed by the egress queues $281a$-$n$, the scheduler $282$, and the egress port $283$. The scheduler $282$ performs the selection of the egress queues $281a$-$n$ for the forwarding of data packets from the egress port $283$.

The control of data flows through the device is determined by the source selection mechanisms $284a$-$n$, the selection device $285$, and the pacing controller $290$. The source selection mechanisms $284a$-$n$ include buffers for multiple priorities and each of the source selection mechanism $284a$-$n$ corresponds to a different ingress device. The source selection mechanism $284a$-$n$ determines which of the egress queues $281a$-$n$ are accessed and in what order.

The egress device is configured to only generate one ACK at a time or a limited number of ACKs at a time. The selection device $285$ accesses the source selection mechanisms $284a$-$n$, in order to pick a source to generate a corresponding acknowledgement message. In one example, the sources are selected in an order that repeats a pattern (e.g., round robin). Alternatively, a deficit weighted round robin (DWRR) or other order may be used. The DWRR order assigns a counter to each source. The counters are initialized at zero. As a data packet is selected, the counter of the corresponding source is incremented by the size of the data packet. This repeats, for example in normal round robin, until one of the counters passes the ceiling for the counters. The source that has exceeded the selection is not selected. This repeats until all of the counters have passed the ceiling. Alternatively, the lowest counter may be selected as the source of the next packet until each of the counters has passed the ceiling.

Normally the packet size does not divide evenly into the counter ceilings. The amount that the last packet exceeds the ceiling is still recorded. When all of the counters have passed the ceiling, the amount of the ceiling is subtracted from all of the counters, leaving the remainder that the counter exceeded the ceiling. The lowest counter is selected to choose the next source, and the process repeats. Each time the selection device 285 receives the selection from the source selection mechanisms 284a-n, the selector chooses the corresponding egress queue 281a-n, the packet is set to be transmitted from the port 283, and an ACK is generated.

However, more considerations may be used when the ACK is generated. The pacing controller 290 performs ACK pacing. ACK pacing involves selecting a delay time between successive ACK generations. The delay time may be proportional to the size of the data packet and inversely proportional to the nominal port rate. For example, on a 10 GB/s port, after generating an ACK for a 3 kilobyte data packet, the next ACK may be delayed by 2.46 microseconds. There may be a number of ACKs at any time that can be generated but are not generated by the egress device because the delay time periods for the ACKs have not elapsed. The ACK pacing commands to generate are sent from the pacing controller 290 as shown by arrow 287.

The pacing controller 290 may also be implemented as a leaky bucket 288 with a drain 289. The leaky bucket 290 is a counter measured in bytes of data that decrements according to the rate of drain 289. The drain rate may be $R_{ack}$ as shown in Equation 2 below.

In effect, the leaky bucket 290 slows the transmission rate of ACKs. The leaky bucket includes a threshold. If the leaky bucket counter is below the threshold, an enable signal 287 is sent to the selection device 285, which triggers the generation of the next ACK. If the leaky bucket counter is above the threshold the enable signal is not sent. As time passes, the leaky bucket counter drains according to $R_{ack}$. Eventually, the leaky bucket counter falls below the threshold, the enable signal 287 is sent to the selection device 285 and another ACK is generated to send to the ingress device.

The value of threshold determines the burstiness of the ACK pacing. In non-congested traffic patterns, it is desirable to avoid delaying ACKs, while in congested traffic patterns, the smoothest possible ACK generation is desirable. In non-congested traffic patterns, the packet arrival rate on average does not exceed the port rate, so if the threshold is set sufficiently high, the bucket level never exceeds the threshold, and no delay is imposed. The threshold is selected to strike a balance between the two extremes. Example settings could be 1 kilobyte or 4 kilobytes.

As the next ACK is selected, a packet length associated with the next ACK is added to the leaky bucket counter. If the leaky bucket is still below the threshold, one more ACK is generated and sent to an ingress device. If the leaky bucket goes above the threshold, no additional ACKs are generated until enough time passes for the drain rate to cause the leaky bucket to fall below the threshold. Effectively, the leaky bucket converts between a bit rate and a message rate.

An accounting of past packet arrivals is maintained by the egress shadow queues 291a-n, the scheduler 293, and the shadow queue rate controller 295. In selecting the next acknowledgement message to be generated, the ACK priority selection device 285 may consider the current levels of the egress shadow queues 291a-n. Each of the egress shadow queues 291a-n corresponds to a class priority.

The egress shadow queues 291a-n are counters that lag the operation of the real egress queues 281a-n. The shadow queue rate controller 295 selects the shadow queue drain rate of the drain 296. The shadow queue drain rate is modulated based on the pacing controller drain rate 289. In one example, the data rate of the packets leaving the node through the port 283 is P. For example, the count of the virtual queue may increase by the size of the arriving packets. The drain of data leaving the real queue is R. R is defined by the speed of the communication path at the output of the real queue. The drain rate of data (or decrement rate of the count value) of the virtual queue is less than R, which may be defined as $R*(1-\epsilon)$, where is $\epsilon$ is a decimal or fractional value between 0 to 1. Example values for $\epsilon$ include ¼, ⅛, ¹⁄₁₆, Pi/4 (0.785) or ⅗. Any number between 0 and 1 is possible. The sum of the virtual queues is compared against a threshold, and if the threshold is exceeded, the drain rate of the virtual queue is set to $R*(1+\epsilon)$. By alternating between the two rates, the aggregate level of the virtual queues is made to oscillate around the chosen threshold, which may be bigger than the possible sum of the real queues, since the real queue size is limited by the actual buffer size. The egress schedulers (scheduler 282 and scheduler 293) may be configured identically. By setting an aggregate virtual threshold sufficiently high, no shadow queue becomes empty, provided at least one corresponding ingress queue is not empty. Then the ACK priority selection device 285 can select over time the correct mix of priorities according to the egress scheduler programming, which would not occur if decisions were based on the real queue sizes, since it is possible that one or more of the real queue sizes becomes empty. Using egress shadow queues to decide which ACK priority to select (which determines the priority of future packet arrivals) the egress buffer size can be kept smaller than it would need to be if real queues were used to affect ACK priority selection.

The selection of epsilon $\epsilon$ dictates how the virtual queue varies in time with respect to the real queue. If $\epsilon$ is large, then the virtual queue indicates congestion when no congestion exists or the likely future congestion never exists. If $\epsilon$ is small, then the difference in growth rate between the virtual queue and the real queue is very small. When $\epsilon$ is zero, then the real queue and the virtual queue drain at the same rate. Effectively, the virtual queue, when $\epsilon$ is set to zero, measures the real queue volume as an indication of congestion. The rates P, R, and $R*(1-\epsilon)$ may refer to instantaneous rates or average rates over a time period. Example time periods include 5 microseconds, 1 milliseconds, 100 microseconds, 1 second, and 10 seconds.

Four scenarios are possible. The first is a scenario when P is less than $R*(1-\epsilon)$. Because P is less than R, no packet data accumulates in the real queue. Because P is less than $R*(1-\epsilon)$, the count value does not increase. Therefore, the real queue volume is empty and the virtual queue value is zero. The second is a scenario when P is equal to $R*(1-\epsilon)$. Because P is less than R, no packet data accumulates in the real queue. Because P equals than $R*(1-\epsilon)$, the count value does not increase or decrease. Therefore, the real queue volume is empty, and the count value of the virtual queue is constant.

The third is a scenario when P is greater than $R*(1-\epsilon)$ and P is less than R. Because P is less than R, no packet data accumulates in the real queue. Because P is greater than $R*(1-\epsilon)$, the count value increases. Therefore, even though no congestion has occurred in the real queue, the virtual queue provides an early warning of potential congestion in the real queue. The count of the virtual queue is an indication of future congestion in the real queue. In addition, the virtual queue may have values related to past congestion of the real queue. Therefore, the virtual queue is an indicator of long term congestion.

The fourth is a scenario when P is greater than R. Because P is greater than R, the real queue volume increases. The real queue may be congested or may be congested after the amount of time required for the real queue to be full (e.g., 10 milliseconds). Because P is much greater than R*(1−ϵ), the count value increases at a rate greater than the rate that the count value increased in the third scenario. The count value increases at a rate faster than the real queue volume, which provides an indication that the real queue may soon be congested. The count value also provides an indication that the real queue is already congested.

The level of the egress shadow queues 291*a-n* may be used to provide congestion notification. For example, the egress device may store a congestion indicator level and compare one or more of the egress shadow queues 291*a-n* to the congestion indicator level. When a current level of one or more of the egress shadow queues 291*a-n* exceeds the congestion indicator level, the egress device may mark outgoing packets so end to end protocols (e.g., transmission control protocol (TCP)) can slow down without relying on packet drops.

The scheduler 293 is coupled to the scheduler 282. For example, the scheduler 293 and scheduler 282 may be configured identically, and react to port flow control in the same way. So if the scheduler 293 is provided with a set of non-empty queues, on average it selects those queues with the same ratio that the scheduler 282 would have used, if the corresponding real queues were maintained non-empty.

The drain rate of the shadow queue ($R_{shadow}$) is variable. Equation 1 describes another example of the definition of the shadow queue ($R_{shadow}$). The drain rate of the shadow queue ($R_{shadow}$) is a function of ϵ and the degree of fabric congestion ($\tilde{Q}$). The degree of fabric congestion ($\tilde{Q}$) may be determined as a difference between the average fabric shadow queue length (Q) and the threshold $Q_{th}$. When the degree of fabric congestion ($\tilde{Q}$) is greater than zero, the drain rate of the shadow queue ($R_{shadow}$) is adjusted to be lowered by a factor equal to $\beta \tilde{Q}$, where β is pacing gain constant. The pacing gain constant may be equal to a saturation level of the fabric shadow queue. Example saturation levels include 1 megabyte and 10 megabytes. When the degree of fabric congestion ($\tilde{Q}$) is lower or equal than zero, drain rate of the shadow queue (R shadow) depends only on the value of the nominal port rate R and on ϵ. Example values for ϵ include ¼, ⅛, 1/32, Pi/4 (0.785) or ⅗. When the fabric congestion is greater than zero, the drain rate of the shadow queue is also decreased proportionally to the fabric congestion, as detected by the average fabric shadow queue level. Equation 1 demonstrates that drain rate of the shadow queue ($R_{shadow}$) slows down in amounts proportional to the fabric shadow queue level. In addition, as shown in Equation 2, the aggregate shadow queue level (s) is compared to the aggregate shadow queue threshold ($s_{ref}$) to determine the shadow queue ($R_{shadow}$).

$$r_{shadow}(\tilde{Q}) = \begin{cases} 1 - \beta\tilde{Q}, & \tilde{Q} > 0 \\ 1, & \tilde{Q} \leq 0 \end{cases} \quad \text{Eq. 1}$$

$$R_{shadow}(\tilde{Q}) = R \cdot \begin{cases} r_{shadow}(\tilde{Q}) + \epsilon, & s > s_{ref} \\ r_{shadow}(\tilde{Q}) - \epsilon, & s \leq s_{ref} \end{cases} \quad \text{Eq. 2}$$

The drain rate of the leaky bucket 288 is also variable. The drain rate may be a function of the degree of fabric congestion ($\tilde{Q}$) and the total memory used by the port (q), and the desired memory usage ($q_{ref}$). The degree of fabric congestion ($\tilde{Q}$) may be determined as a difference between the average fabric shadow queue length (Q) and the threshold $Q_{th}$. Equation 3 is one example definition of the drain rate. The term $q_{ref}$ describes a target port memory usage. For example, the target port memory usage may specify a target level in the egress queue. So the term $$\frac{q - q_{ref}}{q_{ref}}$$

is a proportion of the current usage to the target usage. Alpha is a scaling factor that may be any value between 0 and 1 (e.g., ¼, ⅛, 1/16). Alpha is selected that so the drain rate does not increase too rapidly when more packets are needed and lead to more congestion in the fabric.

$$R_{ACK}(q, \tilde{Q}) = R \cdot \begin{cases} \min\left(1 - \alpha\frac{q - q_{ref}}{q_{ref}}, 1 - \beta\tilde{Q}\right), & \tilde{Q} > 0 \\ 1 - \alpha\frac{q - q_{ref}}{q_{ref}}, & \tilde{Q} \leq 0 \end{cases} \quad \text{Eq. 3}$$

The acknowledge rate $R_{ack}$ is modulated so that the egress buffer is kept at the target level $q_{ref}$. However, this goal may not be achievable in presence of persistent fabric congestion. In this case, Equation 3 slows down the ACK pacing enough for the fabric shadow queue to stop increasing. An equilibrium is reached such that the fabric shadow queue possibly oscillates, but does not reach its saturation point. For example, if the fabric capacity is sufficient to deliver only half the port bandwidth, the fabric shadow queue oscillates around a value such that β*Q=0.5. Using the default setting for beta (1/the fabric shadow queue saturation level, so 1/1M) implies that the fabric shadow queue oscillates at about 500 kilobytes. Once the fabric shadow queue level does not increase further, the fabric links are no longer congested, but are kept close to congestion. So in exchange for further slight reduction in fabric capacity, the fabric real queue sizes are minimized, and the latency through the fabric is kept at a minimum. The egress device does not have direct information of the actual fabric capacity. The control loop law embodied in Equation 3 causes the egress device to slow down enough to mitigate fabric congestion. If the traffic entering the switch and directed to a certain port has a rate lower than $R_{ack}$, then effectively the corresponding ACKs are not slowed down by fabric congestion (which is caused by other ports), and that traffic still experiences minimal latency. Equation 1 allows the ACK priority selector 285 to correctly perform its duties, even for the case of fabric congestion, where the egress real queues are persistently, and not just sporadically, empty, and so their value is not useful. This because the egress shadow queue drain rate is sufficiently slowed down so that the egress shadow queues still are not empty, but instead maintain on aggregate their desired level $s_{ref}$.

The fabric can be persistently congested due to failure of one or several fabric chips (so the traffic is load balanced among the surviving chips) or because of the presence of unregulated traffic (e.g., multicast).

When all of the ingress devices were to send a burst initially, using up the default window or the assigned window, the fabric may experience congestion. However, the congestion is temporary because of the operation of Equations 1 and 2 and 3. One the initial burst is exhausted, the egress device takes control of the sources by assigning windows sufficient to achieve their share of the destination port bandwidth, and by pacing ACKs according to Equation 3. The aggregate window size assigned to all sources is limited, so the amount of queue build-up in the fabric gets under control. Once appropriate window sizes are given to all ingress devices, the egress device controls the advancement of windows through acknowledgements. When a source is using the entire assigned window and the packet size is constant, each received ACK allows a source to send exactly one more packet. Since the egress paces the ACKs, then the ACKs arrive to different ingress in a staggered way, and so also the packet departure and later arrival times at the egress are staggered, so the rate of arrival is approximately constant.

Figure 10:
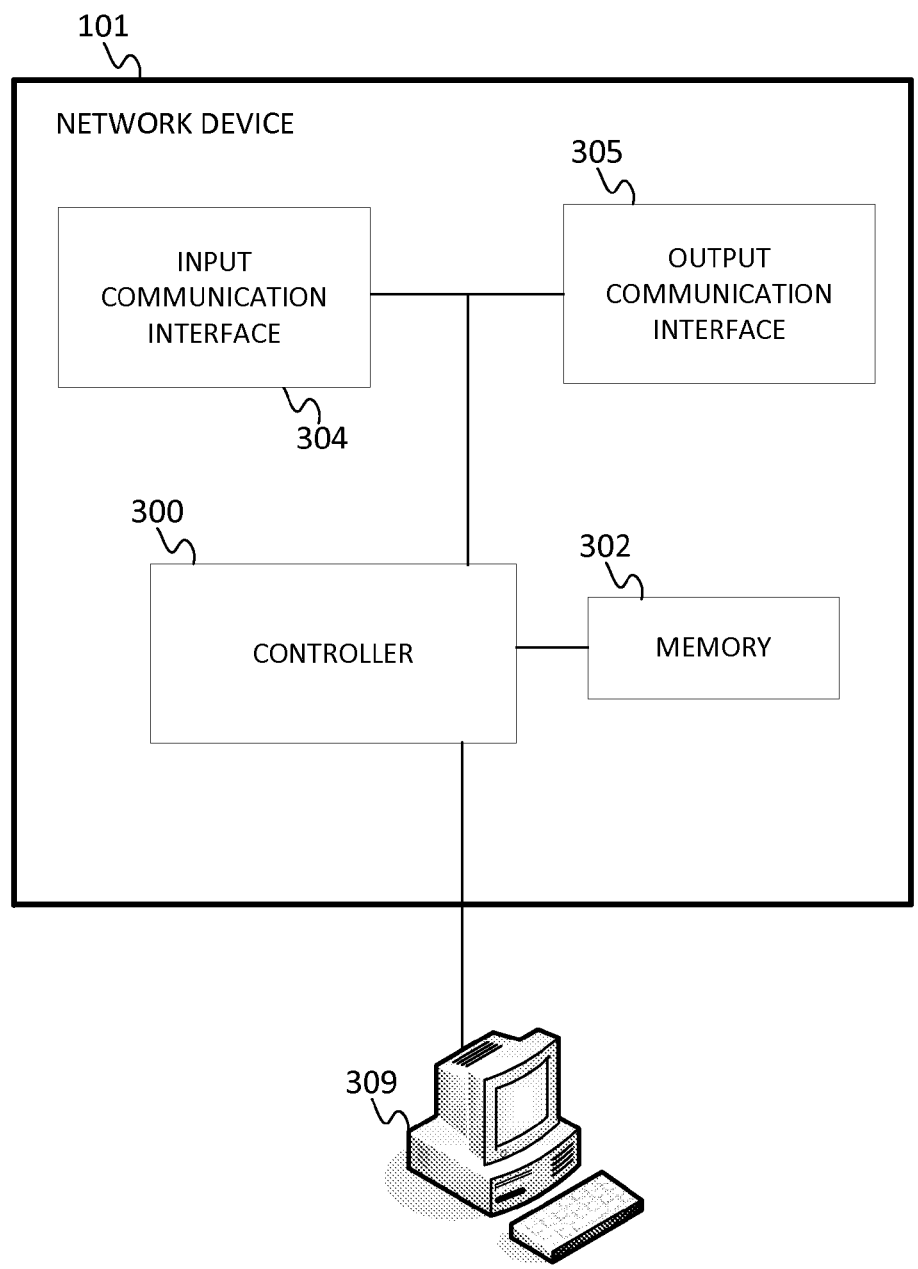
FIG. 10 illustrates an example network device for intra switch transport control.

FIG. 10 illustrates an example network device 101 for intra switch transport protocol control. The network device 101 may include one or more integrated circuits programmed or designed to forward data packets. For example, the network device 101 may include an application specific integrated circuit (ASIC). Other devices than ASIC may be used, such as field programmable gate arrays or general processors. The network device 101 includes at least a controller 300, a memory 302, an input communication interface 304, and an output communication interface 305. The network device 101 may also communicate with a workstation 309.

The controller 300 may be configured to control the ingress device, the egress device, in the alternative, or both, as a single controller. The controller 300 is configured to perform the operations and functions described in the above embodiments. The memory 302 may be a single memory or multiple memories allocated and distributed according to the queues described in the above embodiments.

In one example, with respect to the egress device aspects of the network device 101, the memory 302 is configured to store a maximum window size according to a predetermined bandwidth and a round trip time between a plurality of ingress ports and an egress port. The maximum window size may be calculated by the controller 300 or may be pre-stored in the memory 302.

The controller 300 is configured to calculate an assigned window value for the one of the plurality of ingress ports based on the maximum window size. The assigned window value may initially be set according to an even distribution of the maximum window size among the ingress devices. Subsequently, the controller 300 may be configured to adjust the assigned window value according to the usage of the ingress devices. Ingress devices with smaller flows (low levels in the VOQ queues) are assigned smaller windows that ingress devices with larger flows (high levels in the VOQ queues). In addition, the assigned window values are assigned according to the average allocated window value. That is, no future window assignment can exceed the current average allocation across associated ingress devices.

Alternatively, the assigned window values is limited by the average of the not yet assigned window values. For example, the assigned window value is the average of the difference between the maximum window size and the sum of the assigned windows. In one example, there are four ingress devices. The first ingress device may be assigned the maximum window size, and the second ingress device may be assigned all of the remaining available window. Therefore, the third and the fourth ingress devices initially have no allocated window. However, after several iterations each of the ingress devices are assigned the same amount of window, which is equal to the average available window size.

The controller 300 is configured to generate an acknowledgment message including the assigned window value for the one of the plurality of ingress ports. The acknowledgment message is a single for the ingress device to slide the assigned window and transmit one or more new data packets. The acknowledgement message may also include an indication of congestion. The indication of congestion may be based on a message from a node in the fabric that packets have been dropped or congestion exists. The indication of congestion may be based on a lagging egress queue that is a predictor of future congestion.

In one example, with respect to the ingress device aspects of the network device 101, the memory 302 is configured to store an egress count level for an egress device. The egress count level is the amount of data stored in the egress queue, which relates to past data transfer.

The controller 300 is configured to detect an arrival of a data packet at the egress queue and calculate a delay time period according to a size of the data packet. The delay time period is proportional to the data packet size. For example, the delay time period may be determined according to a counter that is increment according to data packet sizes and decremented over time at a draining rate. The controller 300 is also configured to generate an acknowledgement message corresponding to the data packet is generated after the delay time period has elapsed. The draining rate may be a variable rate calculated by the controller 300 according to a function of fabric congestion and a memory size of the egress queue.

The controller 300 may include a general processor, digital signal processor, an application specific integrated circuit (ASIC), field programmable gate array (FPGA), analog circuit, digital circuit, combinations thereof, or other now known or later developed processor. The controller 300 may be a single device or combinations of devices, such as associated with a network, distributed processing, or cloud computing.

The memory 302 may be a volatile memory or a non-volatile memory. The memory 302 may include one or more of a read only memory (ROM), random access memory (RAM), a flash memory, an electronic erasable program read only memory (EEPROM), or other type of memory. The memory 302 may be removable from the network device 101, such as a secure digital (SD) memory card.

In addition to ingress ports and egress ports, the input communication interface 304 and the output communication interface 305 may include any operable connection. An operable connection may be one in which signals, physical communications, and/or logical communications may be sent and/or received. An operable connection may include a physical interface, an electrical interface, and/or a data interface.

Figure 11:
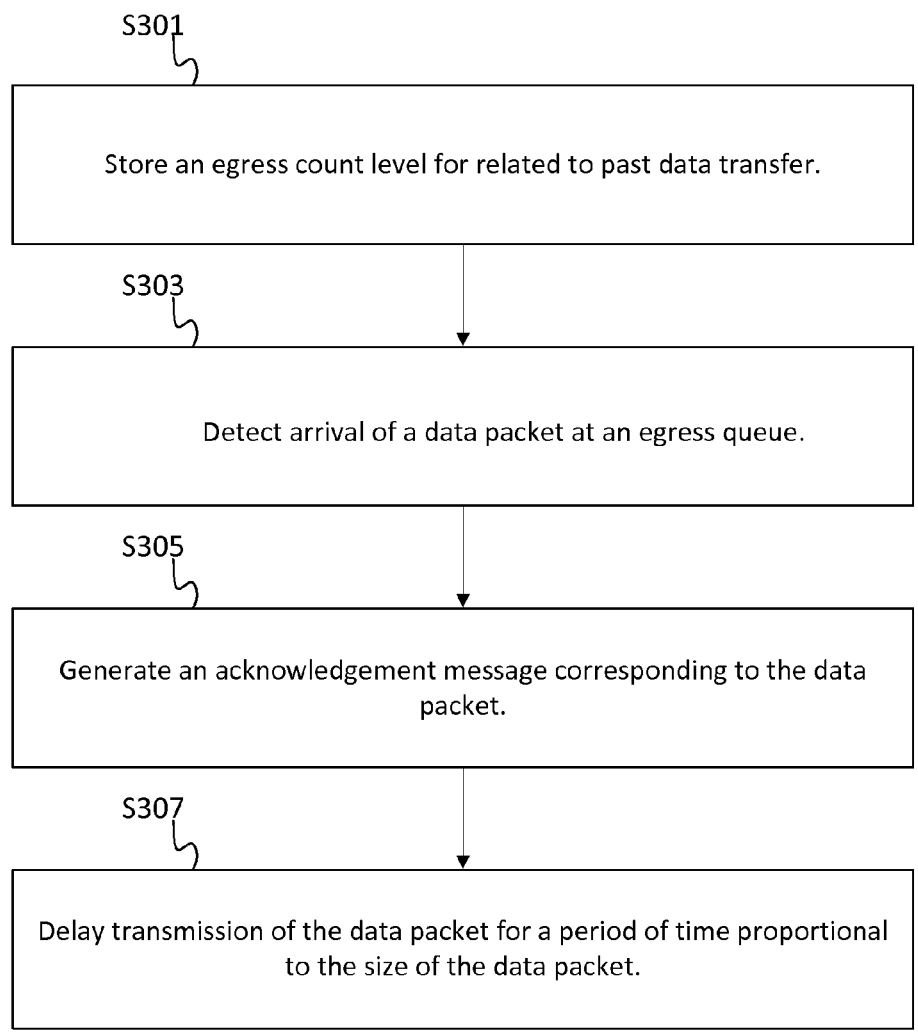
FIG. 11 illustrates an example flowchart for intra switch transport control.

FIG. 11 illustrates an example flow chart for the operation of the egress device in intra switch flow control. At act S301, the egress device stored an egress count level related to pending data transfer. The egress count level may describe the current storage levels in the egress queue. The egress count level may be targeted at approximately half of the memory allotted to the egress queues.

At act S303, the egress device selects a data packet at an egress queue based on the egress count level. For example, the smallest count level from a set of egress device may be selected. Alternatively, a selection algorithm may semi-randomly select the data packet. Semi-randomly means that the egress device first determines a set of eligible egress queues, then randomly selects one of the egress queues in the set. The data packet that is selected is forwarded as soon as the egress port is available.

At act S305, the egress device generates an acknowledgement message corresponding to the data packet. The acknowledgement message lists the packet identity of the data packet that was forwarded and may optionally include congestion information and window information. At act S307, the egress device is configured to delay transmission of the next ACK for a period of time proportional to the size of the data packet. The delay may be performed using a counter that is incremented according to data packet sizes and decremented over time at a draining rate.

The delay is an example of pacing the acknowledgment message. Pacing the ACKs allows precise rate control, even if the windows assigned are not exact. For a source to achieve a rate R, it needs a window greater than the bandwidth times the round trip time of the system. A bigger window does not automatically result in more data packets present in the fabric, since the destinations perform ACK pacing. On steady state, when the source uses the entire available window, the excess window exists as received, possibly sent out, but still yet to be acknowledged data at the destination. Assigning a big window however increases the risk of bursts by a source.

With a multi-path fabric, packets can arrive at the egress out of order. If the destination buffer is filled up with out-of-order packets, a deadlock situation occurs. It is possible the destination has buffer filled up and a hole in the sequence exists. It cannot dequeue under such circumstance. Since no new data can get in, the buffer remains full forever. The problem disappears if the destination can drop yet to acknowledge packets to leave room for completing packet reorder. To preserve end-to-end no drop behavior while controlling the destination buffer size, the source may have the capability to retransmit dropped packets to ensure the destination gets the data eventually. Another benefit of retransmission is that the fabric can drop packets to keep its efficiency up by reducing head of line blocking. This pushes buffer requirements to source virtual output queue. The additional buffer capacity for covering the round trip delay is a small fraction of ingress buffer size.

The network device 101 may be a node in a network. The network device 101 may be a node within a switch. The network device may be a destination node or a source node, or include both the destination node and the source node. Generally, the source node sends traffic to the destination node through a variety of paths. A periodic series of packets from the destination node to the source node include data indicative of congestion values. The congestion values may be measured in packets (quantity), bandwidth (bits/second), or total volume (bytes). The destination node defines that acceptable amount of traffic such that it does not exceed the speed of the link between the source node and the destination node. There may be multiple communication paths transverse multiple intermediate nodes between the source node and the destination node. The intermediate nodes may have different levels of congestion.

Multicast may be implemented by replicating a received packet for distribution to a set of output ports by way of a set of output queues. A multicast packet includes a label for the multicast group that defines the destinations of the multicast packet. A bitmap (e.g., a fabric port of exit (FPOE) bitmap) may define which of the set of output queues the multicast packet is to be forwarded to in order to reach the destinations.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/

IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
identifying a maximum window size for network traffic according to a predetermined bandwidth and a round trip time between a plurality of ingress ports of a network switch and an egress port of the network switch;
receiving virtual output queue values from the plurality of ingress ports;
calculating an assigned window value for one of the plurality of ingress ports based on the maximum window size and an adjustment factor, wherein the maximum window size is distributed across the plurality of ingress ports;
generating an acknowledgment message including the assigned window value for the one of the plurality of ingress ports;
assigning an initial value for the assigned window value for the one of the plurality of ingress ports according to a predetermined portion of the maximum window size; and
generating a subsequent value for the assigned window value for the one of the plurality of ingress ports according to an average of initial values for assigned window values over a number of the plurality of ingress ports that includes at least one ingress port whose initial value for the assigned window value is zero.

2. The method of claim 1, wherein each of the virtual output queue values describes an amount of data at respective ones of the plurality of ingress ports destined for the egress port; the method further comprising:
adjusting the assigned window value for the one of the plurality of ingress ports according to the virtual output queue value for the one of the plurality of ingress ports.

3. The method of claim 1, further comprising:
receiving a data packet at the egress port from the one of the plurality of ingress ports; and
sending the acknowledgement message including the assigned window value for the one of the plurality of ingress ports to the one of plurality of ingress ports in response to the data packet.

4. The method of claim 1, wherein the adjustment factor for the assigned window value for the one of the plurality of ingress ports is based on a rate as a function of congestion.

5. The method of claim 1, wherein a ratio of the assigned window value to the maximum window size is proportional to a ratio of the virtual output queue value for the one of the plurality of ingress ports to a total virtual output queue value that is based on a sum of the virtual output queue values for the plurality of ingress ports.

6. An apparatus comprising:
a memory configured to store a maximum window size for network traffic according to a predetermined bandwidth and a round trip time between a plurality of ingress ports of a network switch and an egress port of the network switch including a grid of nodes between the egress port and the plurality of ingress ports, wherein the maximum window size is distributed across the plurality of ingress ports; and
a controller configured to:
calculate an assigned window value for one of the plurality of ingress ports based on the maximum window size and an adjustment factor;
generate an acknowledgment message including the assigned window value for the one of the plurality of ingress ports;
assign an initial value for the assigned window value for the one of the plurality of ingress ports according to a predetermined portion of the maximum window size; and
generate a subsequent value for the assigned window value for the one of the plurality of ingress ports according to an average of initial values for assigned window values over a number of the plurality of ingress ports, wherein the number of the plurality of ingress ports includes at least one ingress port whose initial value for the assigned window value is zero,
wherein the adjustment factor for the assigned window value for the one of the plurality of ingress ports is a function of congestion.

7. The apparatus of claim 6, wherein the grid of nodes includes a plurality of stages.

8. The apparatus of claim 6, wherein the controller receives virtual output queue values from the plurality of ingress ports.

9. The apparatus of claim 8, wherein each of the virtual output queue values describes an amount of data at respective ones of the plurality of ingress ports destined for the egress port, wherein the controller adjusts the assigned window value for the one of the plurality of ingress ports according to a virtual output queue value for the one of the plurality of ingress ports.

10. The apparatus of claim 6, wherein the controller is further configured to:
receive a data packet at the egress port from the one of the plurality of ingress ports.

11. The apparatus of claim 10, wherein the controller is further configured to:
send the acknowledgement message including the assigned window value for the one of the plurality of ingress ports to the one of plurality of ingress ports in response to the data packet.

12. A method comprising:
storing an egress count level for an egress device, wherein the egress count level relates to pending data transfer;
selecting an egress queue based on the egress count level;
generating, at a controller, an acknowledgement message corresponding to the egress queue;
accessing a size of a data packet in the egress queue;
delaying transmission of a subsequent acknowledgement message for a period of time based on the size of the data packet and an indicator of congestion upstream of the egress device;
generating an egress shadow queue value based on a rate that is less than a rate of the egress queue;
comparing the egress shadow queue value to an egress shadow queue threshold; and
inserting a congestion indication into the data packet when the egress shadow queue value exceeds the egress shadow queue threshold.

13. The method of claim 12, wherein the period of time based on the size of the data packet is determined according to a draining rate.

14. The method of claim 13, wherein the draining rate is a function of fabric congestion and a memory occupancy of a sum of egress queues.

15. The method of claim 12, further comprising:
generating a second subsequent acknowledgement message corresponding to a second data packet for a second egress queue, wherein the second egress queue is selected by comparing the size of egress queues, and selecting more frequently the egress queues that have smaller size.

16. The method of claim 12, further comprising:
selecting the egress queue based on the egress shadow queue value.

17. An apparatus comprising:
a memory configured to store an egress count level for an egress device, wherein the egress count level relates to past data transfer; and
a controller configured to detect arrival of a data packet at an egress queue and calculate a delay time period according to a size of the data packet and an indication of congestion, wherein an acknowledgement message corresponding to the data packet is generated after the delay time period has elapsed,
wherein the controller is configured to calculate an egress shadow queue value based on a rate that is less than a rate of the egress queue, and insert a congestion value into the data packet when the egress shadow queue value exceeds an egress shadow queue threshold.

18. The apparatus of claim 17, wherein the delay time period is determined according to a counter that is incremented according to data packet sizes and decremented over time at a draining rate.

19. The apparatus of claim 18, wherein the draining rate is a function of fabric congestion and a memory occupancy of a sum of egress queues.

20. The apparatus of claim 17, wherein the controller is further configured to:
select the egress queue based on the egress shadow queue value.

* * * * *